(12) United States Patent
Jackson et al.

(10) Patent No.: US 8,215,725 B2
(45) Date of Patent: Jul. 10, 2012

(54) BRAKE SYSTEM AND METHOD

(75) Inventors: Jonathan Leslie Christopher Jackson, Herefordshire (GB); Brendan Joseph Wilde, South Gloucestershire (GB); Martin Pors Taylor, Torfaen (GB); Ralf Leiter, Mendig (DE)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 738 days.

(21) Appl. No.: 12/367,015

(22) Filed: Feb. 6, 2009

(65) Prior Publication Data

US 2009/0195058 A1     Aug. 6, 2009

(30) Foreign Application Priority Data

Feb. 6, 2008   (GB) .................................. 0802212.1

(51) Int. Cl.
  *B60T 7/20*         (2006.01)
(52) U.S. Cl. ........................................ 303/124; 303/191
(58) Field of Classification Search .................. 303/7–9, 303/123, 124, 22.4, 122, 191, 192; 188/265
  See application file for complete search history.

(56) References Cited

U.S. PATENT DOCUMENTS

| | | | |
|---|---|---|---|
| 4,574,927 A | 3/1986 | Sturtz, Jr. | |
| 5,002,343 A | 3/1991 | Brearley et al. | |
| 6,256,568 B1 | 7/2001 | Siepker et al. | |
| 6,273,522 B1 | 8/2001 | Feetenby et al. | |
| 6,382,741 B1 | 5/2002 | McCann et al. | |
| 6,587,044 B2 * | 7/2003 | Ehrlich et al. | 340/441 |
| 6,994,191 B2 | 2/2006 | McCann et al. | |
| 7,008,025 B2 | 3/2006 | McCann | |
| 7,234,785 B1 | 6/2007 | McCann et al. | |
| 7,286,046 B2 * | 10/2007 | Kinsey et al. | 340/431 |
| 7,325,887 B2 | 2/2008 | McCann et al. | |
| 2002/0117892 A1 | 8/2002 | McCann et al. | |
| 2005/0093365 A1 | 5/2005 | McCann et al. | |
| 2005/0275282 A1 | 12/2005 | McCann | |
| 2006/0131950 A1 | 6/2006 | Larson | |
| 2007/0262637 A1 * | 11/2007 | Bennett | 303/3 |

FOREIGN PATENT DOCUMENTS

| | | |
|---|---|---|
| DE | 4316993 | 11/1994 |
| EP | 0949432 | 10/1999 |
| EP | 0995657 | 4/2000 |
| EP | 1442952 | 8/2004 |
| EP | 1531100 | 5/2005 |
| EP | 1596089 | 11/2005 |
| EP | 1596090 | 11/2005 |
| JP | 59-11935 | 1/1984 |

OTHER PUBLICATIONS

United Kingdom Search Report for GB0901930.8 dated Jun. 4, 2009.
United Kingdom Search Report for GB0901931.6 dated Jun. 5, 2009.
United Kingdom Search Report for GB0901929.0 dated Jun. 4, 2009.
United Kingdom Search Report dated May 27, 2008.

* cited by examiner

*Primary Examiner* — Melanie Torres Williams
(74) *Attorney, Agent, or Firm* — Carlson, Gaskey & Olds, PC

(57) ABSTRACT

An electromechanical parking brake system for a heavy vehicle braked by air-actuated service brakes includes an EPB-ECU and a first electromechanical parking brake actuator controlled by the EPB-ECU. The electromechanical parking brake system further includes a redundant sub-system for applying a second parking brake in an event of a failure in the EPB-ECU or the first electromechanical parking brake actuator.

23 Claims, 16 Drawing Sheets

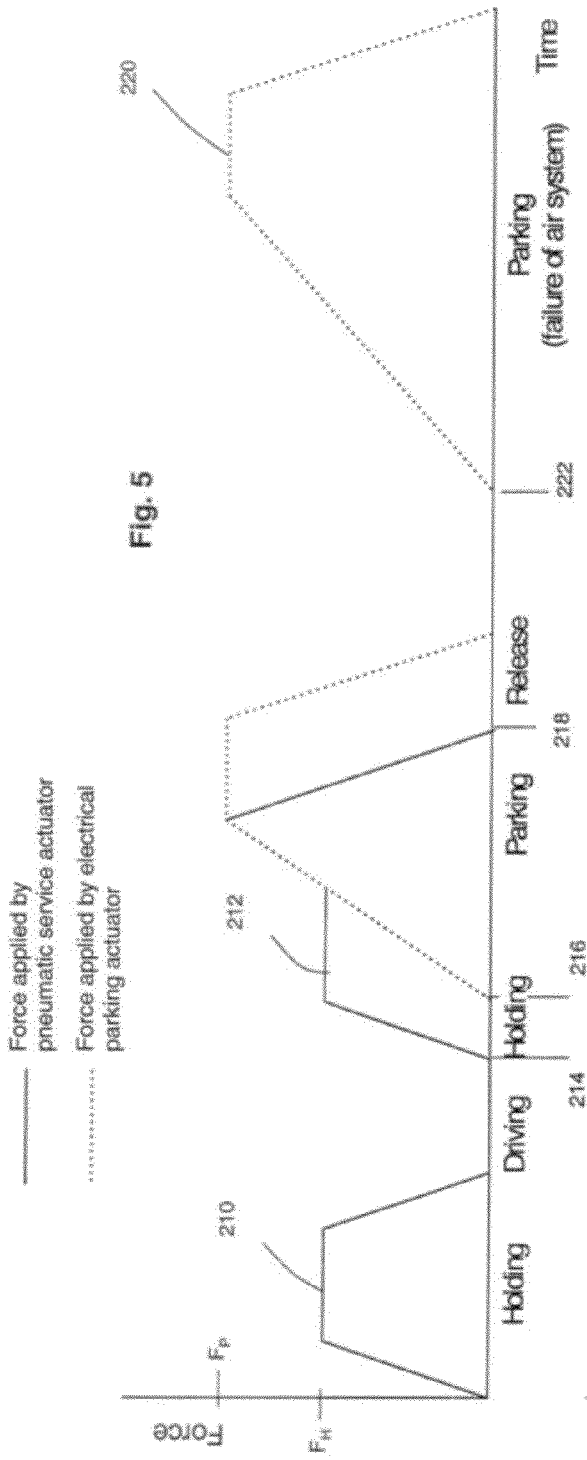
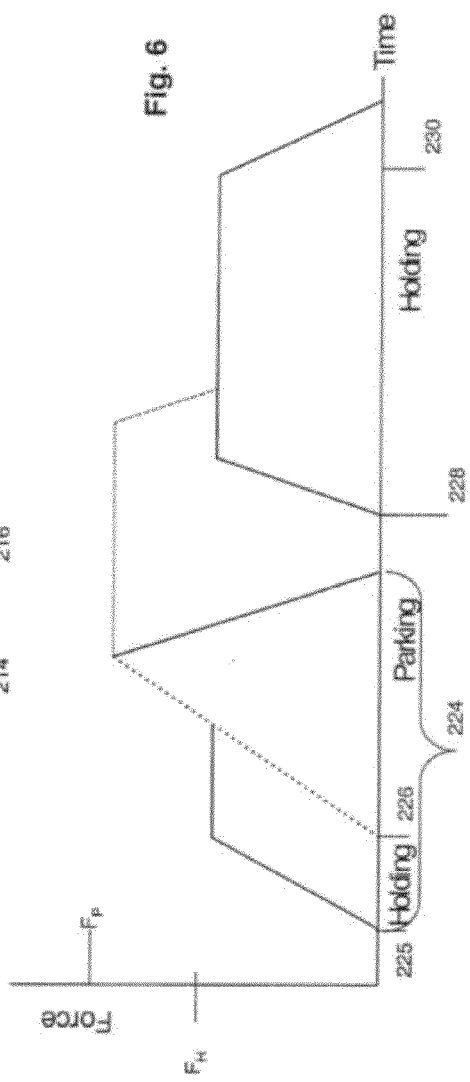
Fig. 5
Fig. 6

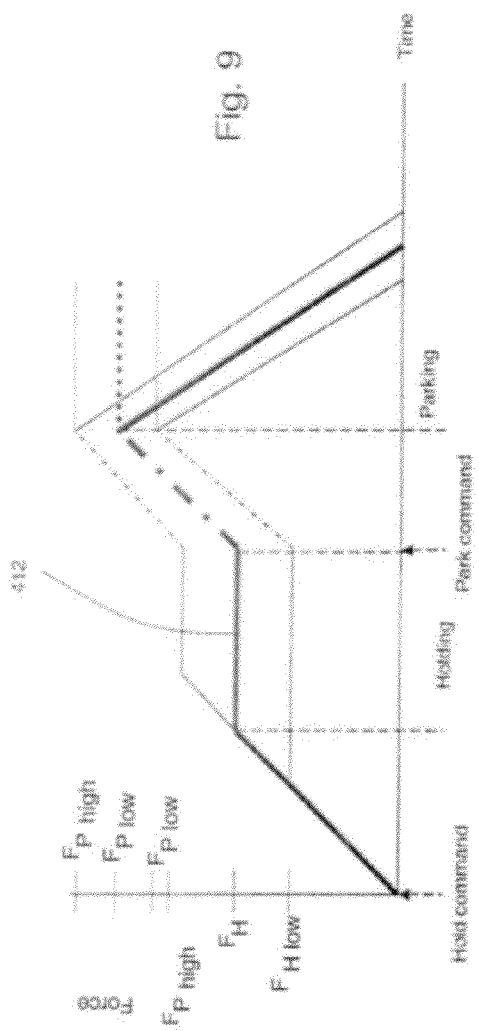
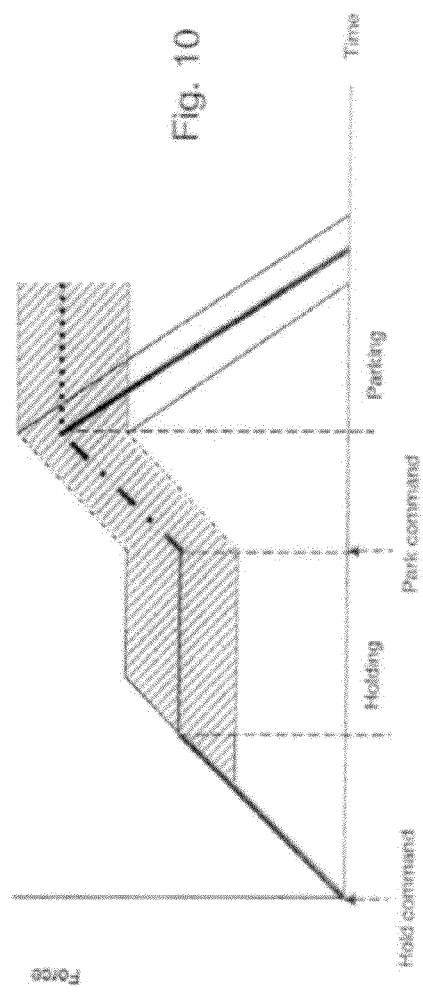

BRAKE SYSTEM AND METHOD

REFERENCE TO RELATED APPLICATION

This application claims priority to United Kingdom Patent Application No. 0802212.1 filed Feb. 6, 2008.

BACKGROUND OF THE INVENTION

The present invention relates generally to a brake system and method. More particularly, the present invention relates to a system configured to estimate a change in temperature of a brake component, a method of estimating the change in temperature of the brake component, and a system and method for applying a parking brake.

Standard braking systems for heavy vehicles, such as trucks, buses and coaches, include air actuated service brakes at each wheel of the vehicle including a membrane type brake chamber biased into a brake off condition, and brakes operable as service and parking brakes on some wheels (e.g., the rear wheels of a tractor unit of an articulated truck and trailer unit). Such combined brakes also include a membrane type air chamber. Behind that, a parking brake chamber is biased into a parking brake-on condition by a spring, but while the vehicle is in motion, is held in the off position by pressurized air introduced into the cylinder. To apply the parking brake, the air is vented, permitting the spring to extend and apply the brake. Such spring brakes maintain a high parking brake force even if the brake disc shrinks due to cooling.

It is desirable to replace the parking brake cylinder by an alternative apparatus of applying the parking brake that is more compact and reduces the amount of components in the vehicle's air supply system. To this end, the present applicant has proposed a number of alternative parking brake devices that utilize electromechanical components, such as electric motors, to apply the parking brake (see for example EP1596089 and EP1596090).

It has now been recognized by the present applicant that one problem with such parking brakes (and with standard spring parking brakes) is that they fully apply the parking brake at its maximum possible force, even if the particular conditions under which the vehicle is to be maintained stationary do not require such a high force to be used. This places the components of the brake, such as the caliper, the operating shaft and the pistons, under unnecessary stress, thus shortening the life of the brake. This problem is particularly acute for applications such as buses, where for instance the parking brake is automatically applied each time the passenger door is opened.

A further problem with known electromechanical parking brakes is that they may, under some circumstances, be unable to account for any shrinkage of brake components, primarily brake discs. Shrinkage may occur as such components cool while a vehicle is parked, following heating that has been frictionally induced by use of the service brake when the vehicle is in motion. If an insufficient parking brake force is maintained after cooling, there is a danger the vehicle may roll away. An additional problem is how to implement such an electromechanical system, including its control in a safe and low cost manner.

The present invention seeks to overcome, or at least mitigate, the problems of the prior art.

SUMMARY OF THE INVENTION

One aspect of the invention provides a system configured to estimate a change in temperature of a brake component of a vehicle brake during a braking operation. The system includes a weight estimation module for estimating a weight of a vehicle to which the brake is fitted, and a volume estimation module for estimating a volume of the brake component. The system also includes a temperature model module for calculating a change in temperature during brake application based on a relationship between the weight of the vehicle as estimated by the weight estimation module, the volume of the brake component as estimated by the volume estimation module, the deceleration of the vehicle, and further constants of the vehicle and/or the brake.

A second aspect of the present invention provides a method of estimating a change in temperature of a brake component of a vehicle brake during a braking operation. The method includes the steps of estimating a weight of a vehicle to which a brake is fitted, estimating a volume of the brake component, and calculating a change in temperature of the brake component based upon the change in velocity of the vehicle, the estimated weight of the vehicle, the estimated volume of the brake component, and further constant values of the brake.

A third aspect of the present invention provides a system for adjusting a brake force to be applied by a brake including a module for estimating a weight of a vehicle to which the brake is fitted, a module for determining an angle of incline upon which the vehicle is positioned, and a control unit for calculating a sufficient brake force to be applied according to predetermined criteria based upon the estimated weight and the determined angle of incline to maintain the vehicle in a stationary state. The control unit is configured to signal the brake to apply the calculated amount of force.

A fourth aspect of the present invention provides a method for adjusting a brake force to be applied by a brake. The method includes the steps of estimating a weight of a vehicle to which the brake is fitted, determining an angle of incline upon which the vehicle is positioned, calculating a sufficient brake force to be applied according to predetermined criteria based upon the estimated weight and the determined angle of incline to maintain the vehicle in a stationary state, and signalling the brake to apply the calculated amount of force.

A fifth aspect of the present invention provides an electromechanical parking brake system for a heavy vehicle braked by air-actuated service brakes. The system includes an EPB-ECU and a first electromechanical parking brake actuator controlled by the EPB-ECU. The system further includes a redundant sub-system for applying a second parking brake in the event of a failure in the EPB-ECU or the first electromechanical parking brake actuator.

A sixth aspect of the present invention provides an electromechanical parking brake system for heavy vehicles including a tractor unit and a trailer unit. The system includes a user input device and a controller. The controller is configured upon receiving a signal corresponding to a predetermined user input from the user input device to enter a test mode in which the controller signals release of a brake on the trailer unit and to maintain or apply a parking brake on the tractor unit such that a vehicle user can determine whether the parking brake of the tractor unit alone is capable of holding the tractor unit and the trailer unit.

A seventh aspect of the present invention provides a method of testing whether the parking brakes of a tractor unit of a heavy vehicle having a tractor and trailer combination can hold the combination. The method includes the steps of a vehicle user carrying out a predetermined input to an electromechanical parking brake system, a controller of the electromechanical parking brake system signalling release of the brakes of the trailer in response to the input, and the controller signalling the return to normal operation of the electromechanical parking system in response to a further predetermined user input or after a predetermined timeout delay.

BRIEF DESCRIPTION OF THE DRAWINGS

Embodiments of the present invention will now be described, by way of example only, with reference to the accompanying drawings, in which:

FIGS. 5 and 6 are diagrams illustrating the relationship between force and time for various braking situations;

FIGS. 9 and 10 are two further diagrams illustrating the change in force over time for further braking operations in accordance with another embodiment of the present invention.

DETAILED DESCRIPTION OF THE PREFERRED EMBODIMENT

Figure 1:
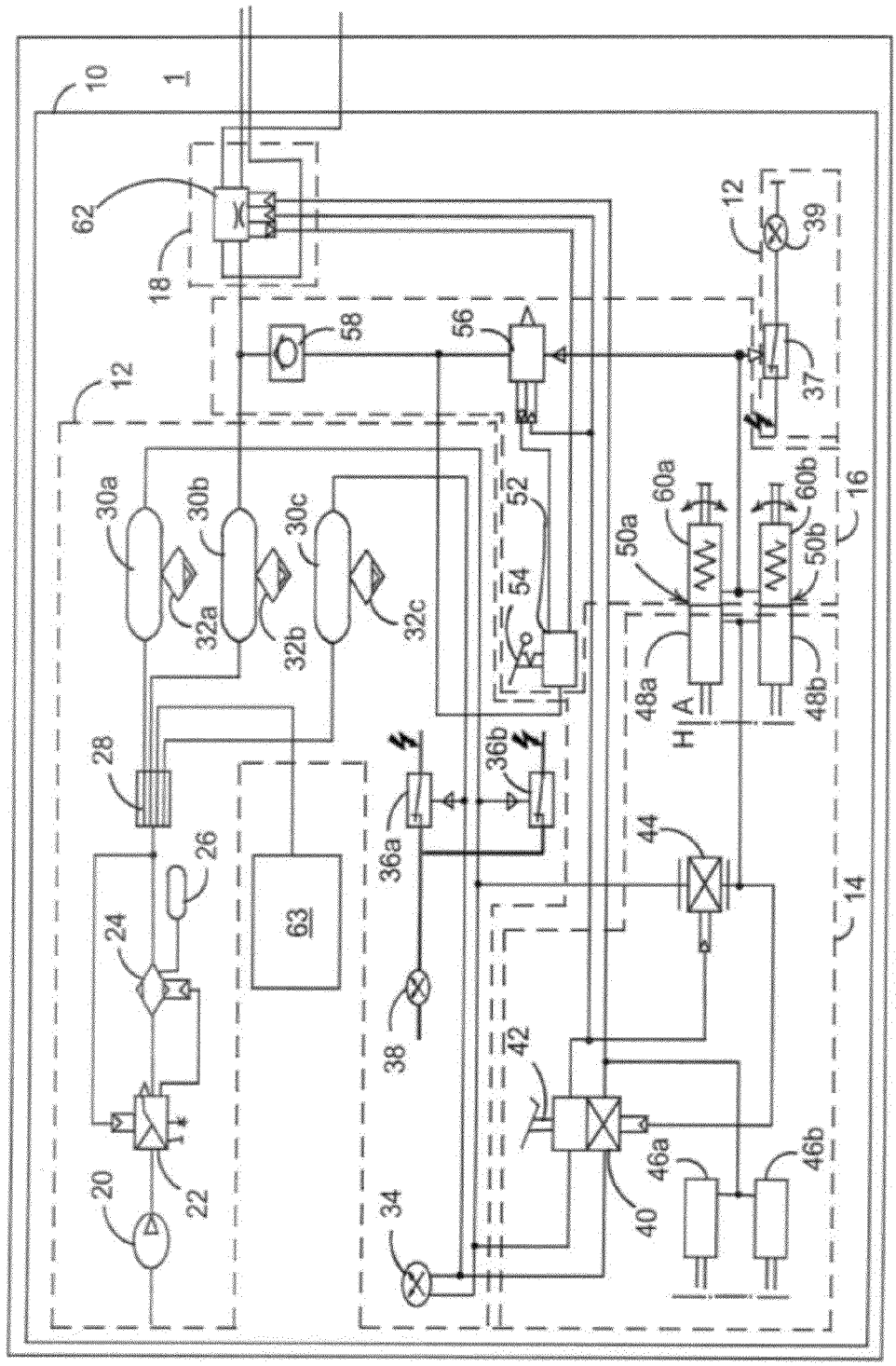
FIG. 1 is a schematic diagram of a known brake system for a tractor unit of a heavy vehicle.

Referring to FIG. 1, a braking system 10 of a tractor unit 1 of an articulated truck is shown schematically. The system includes an air supply portion 12, a service brake portion 14, a parking brake portion 16, and a trailer control portion 18. The layout of such a system is well known to those skilled in the art, but for convenience, the prime components are briefly described below. The thinner connecting lines denote air connections, and the thicker connecting lines electrical connections.

The air supply portion 12 includes an air compressor 20 connected to a pressure regulator 22, an air dryer 24 having its own regeneration reservoir 26, a four circuit protection valve 28, and three air reservoirs 30a, 30b and 30c each with an associated water release valve 32a, 32b, and 32c. The supply lines from the air reservoirs 30a and 30c are further connected to a double pressure sensor 34. The double pressure sensor 34 enables the pressures in the supply lines from the two air reservoirs 30a and 30c to be compared to check for problems, such as leaks.

A pair of pressure switches 36a and 36b are also connected to the air lines from the air reservoirs 30a and 30c and provide an electrical output to a pressure warning lamp 38 via an electrical circuit, shown in thicker lines. Finally, a pressure switch 37 and a pressure warning lamp 39 are connected to the air supply line to the parking brake.

The service brake portion 14 includes a service brake valve 40 connected to a driver's brake pedal 42, a load sensitive brake force meter 44, service brake cylinders 46a and 46b for the brakes connected to a front axle of the tractor unit 1, and service brake portions 48a and 48b of a combined parking and service brake cylinders 50a and 50b connected to a rear axle of the vehicle.

The parking brake portion 16 includes a parking brake valve 52 connected to a parking brake lever 54 operable by the driver to apply the parking brake. The parking brake valve 52 is connected via a relay valve 56 having overload protection to a non-return valve 58 and to spring parking brake portions 60a and 60b of the combined park and service brake cylinders 50a and 50b.

The trailer control portion 18 includes a trailer control valve 62 and connections to connect trailer air lines thereto. This would, of course, be omitted from heavy vehicles that do not tow a trailer, such as buses.

Figure 2:
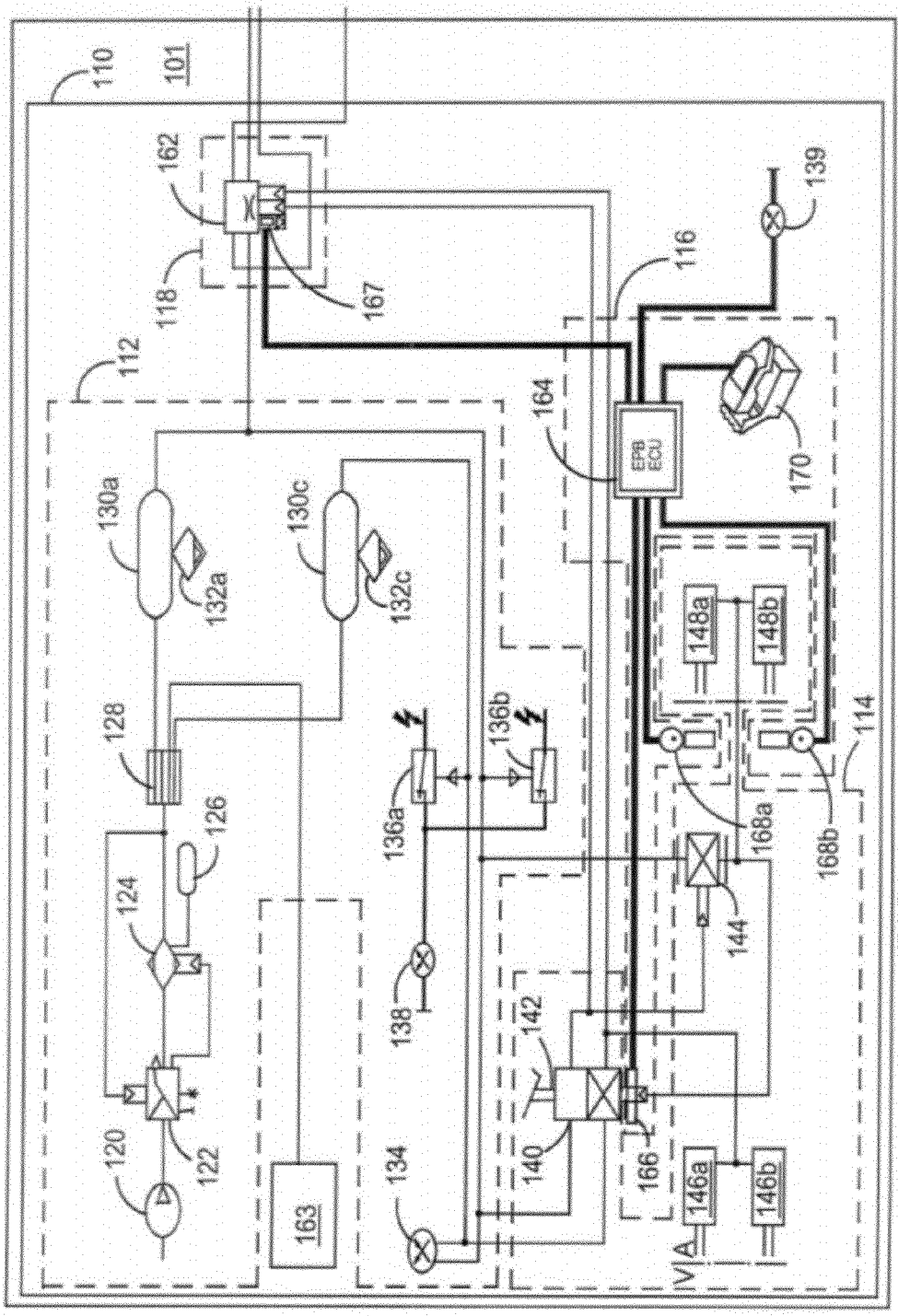
FIG. 2 is a schematic diagram of a brake system for a tractor unit of a heavy vehicle according to a first embodiment of the present invention.

With reference to FIG. 2, a brake system according to an embodiment of the present invention is illustrated, with parts similar to those of FIG. 1 labelled 100 higher. Only those parts that differ from FIG. 1 are discussed in detail below.

In FIG. 2, the air supply portion 112 is substantially unchanged from FIG. 1, except that there is no equivalent of the air reservoir 30b and the corresponding water release valve 32b. Likewise, the service brake portion 114 is similar except that the service brake valve 140 has an additional electrical service brake valve actuator 166, described in more detail below. Due to the deletion of one air reservoir, a smaller compressor 120 can be provided.

In contrast, the parking brake portion 116 is fundamentally altered. The parking brake portion 116 no longer uses any form of pressurized air from the air supply portion 112 and now operates solely electromechanically. At the heart of the parking brake portion 116 is an electric parking brake electronic control unit module (hereinafter "EPB-ECU") 164, which is shown in more detail in FIG. 3A. The EPB-ECU 164 is connected to the service brake valve actuator 166 at the service brake valve 140, as discussed above, to a valve actuator 167 at the trailer control valve 162 such that electrical signals therefrom may open and close these valves in response to signals from the EPB-ECU 164. As a result, the EPB-ECU 164 may also apply the service brake and parking brakes of a trailer (not shown) if connected to the tractor unit 101. Trailer parking brakes would normally be standard spring-type brakes irrespective of electromechanical parking brakes being used on the tractor unit.

In addition, the EPB-ECU 164 has outputs to electromechanical parking brakes 168a and 168b for each of the rear wheels of the tractor unit. The EPB-ECU 164 receives an input from a parking brake lever 170 mounted in a cab of the tractor unit 101. Some or all of these connections may occur over a Controller Area Network (CAN) bus provided in the vehicle, by direct wiring, or by another suitable kind of communication (for example, a short range radio link).

Figure 3A:
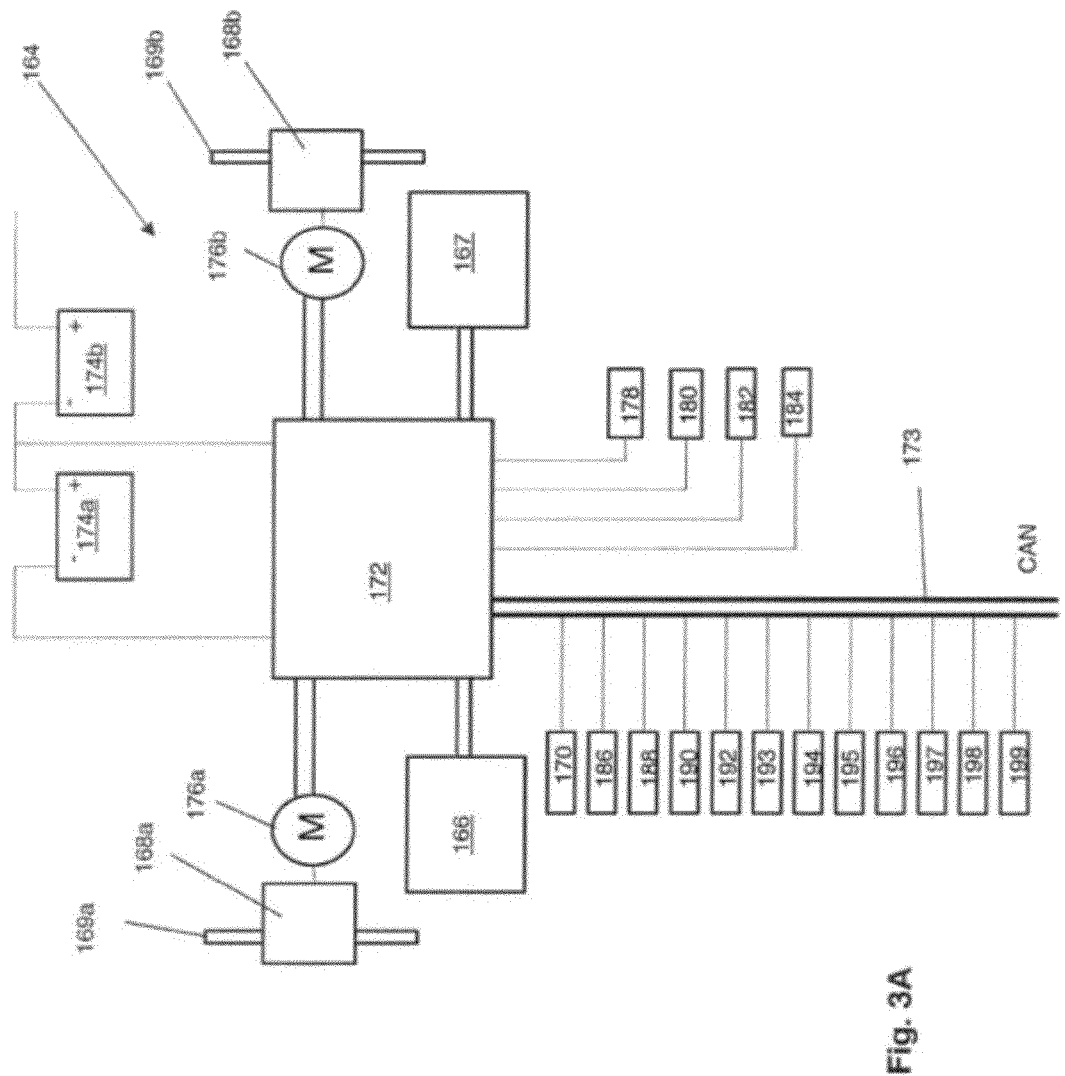
FIG. 3A is a schematic diagram of a control circuit for the brake system of FIG. 2.

FIG. 3A illustrates one embodiment of the EPB-ECU 164 which includes a single ECU 172 drawing its power from a single 12V battery 174a of a two battery power supply that further includes a second battery 174b. The ECU 172 receives driver demand inputs from a parking brake lever 170 and a "hill-hold" button 186. The ECU 172 further receives inputs via a CAN bus 173 from the following sensors: a brake pedal switch 188, an inclinometer 190, a sensor on the load sensitive brake force meter 192, an ignition switch sensor 193, an ambient temperature sensor 194 (typically present in air conditioning systems), a seat belt sensor 195, an engine torque sensor 196, a brake torque sensor, a retarder torque sensor 198, and wheel speed sensors 199 (from the vehicle ABS/EBD system). In some embodiments, the inclinometer 190 can be part of the EPB-ECU 164.

The ECU 172 has outputs to first and second motors 176a and 176b, respectively, of the electromechanical parking brakes 168a and 168b on the rear axle of the tractor unit. The parking brakes are arranged to clamp the discs 169a and 169b. In alternative embodiments, the parking brakes 168a and 168b may be provided on a front axle of the vehicle. In this configuration, the parking brake can act as a secondary brake in the event of a failure in the air supply to the service brake, thus fulfilling the requirements of ECE 13 ("uniform provisions concerning the approval of vehicles of categories M, N and O with regard to braking").

The ECU 172 has a further output to the service brake valve actuator 166, for the service brake valve 140, and the valve actuator 167 of the trailer control valve 162. In addition, it has the following outputs to indicate its status to the driver: a failure light 178, an activity lamp 180, an audible warning buzzer 182, and a demand switch lamp 184. The ECU 172 is programmed to apply the parking and/or service brakes in response to inputs from the parking brake lever and various sensors provided in the vehicle in accordance with various algorithms as set out below.

However, it is desirable to use the system of FIGS. 2 and 3A only when an alternative back-up for the parking brake function is available, such as a suitable gearbox lock or spring brakes on the other axle (or in some instances, the same axle), since there is no redundancy within the EPB-ECU 164 itself, should a malfunction occur.

Figure 3B:
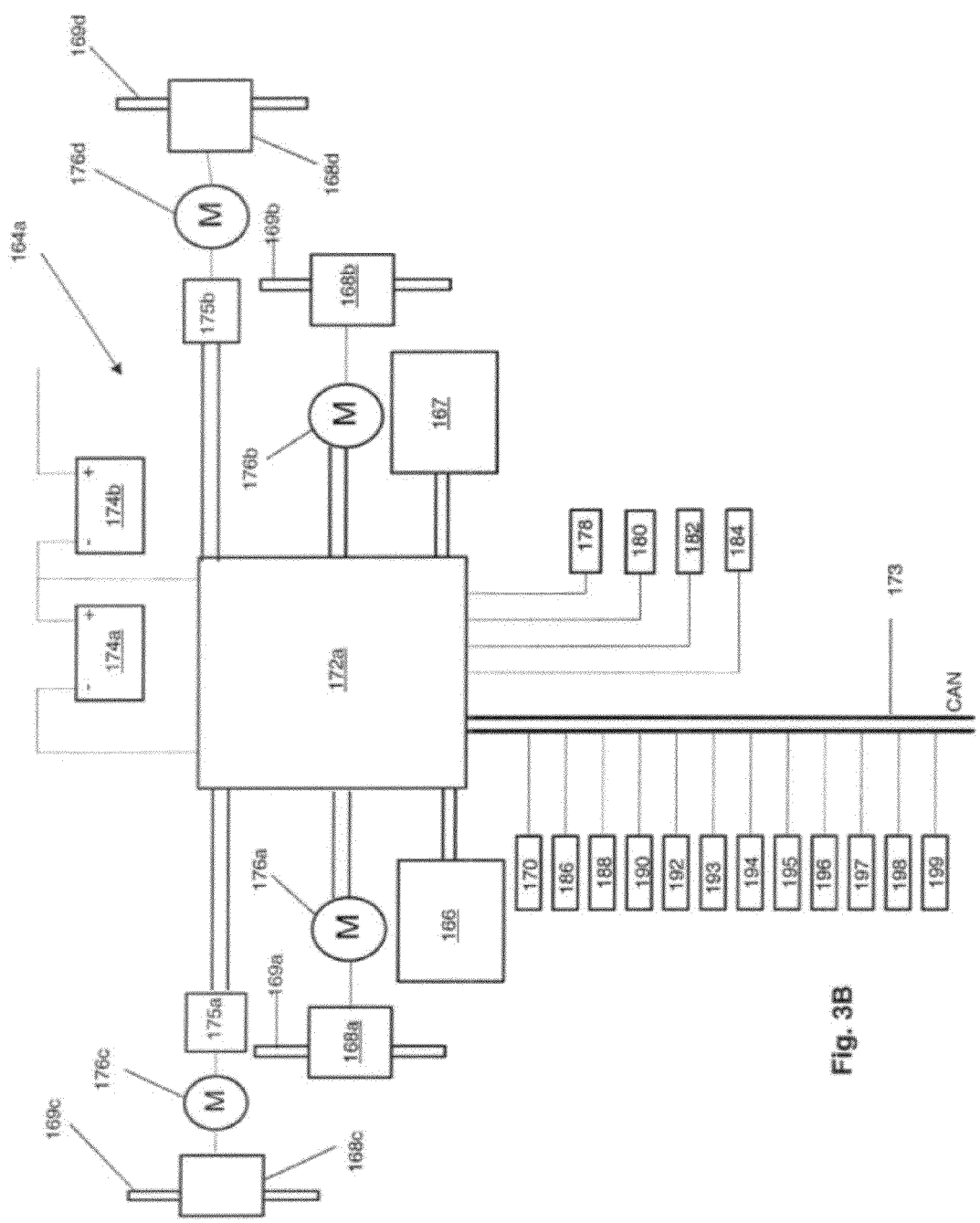
FIG. 3B is a schematic diagram of a variant of the control circuit of FIG. 3A.

FIG. 3B shows a variant of the FIG. 3A system in which a single ECU 172b controls electromechanical parking brakes 168a and 168b on a front axle of a vehicle and electromechanical parking brakes 168c and 168d on the rear axle of a vehicle. The parking brakes 168a and 168b are controlled directly in the same way as in FIG. 3A.

The parking brakes 168c and 168d on the rear axle are, however, controlled by "smart" actuators incorporating their own local controllers 175a and 175b on a separate channel of the ECU 172b having its own power supply. The local controllers 175a and 175b contain the necessary EPB logic and/or can provide feedback on achieved clamp or compliance force and fault state to the master and slave controllers. The connection of this second channel may be via a CAN or private bus. As a result, the supply of power to the actuator motors 176c and 176d is controlled by the controllers 175a and 175b.

The controllers 175a and 175b are also connected via the CAN/private bus to a gearbox controller of the vehicle (not shown). If the ECU 172b fails, the gearbox controller takes over control of parking brakes 168c and 168d and is thus able to provide a "failure mitigating" emergency function on one of the two axles.

Figure 4:
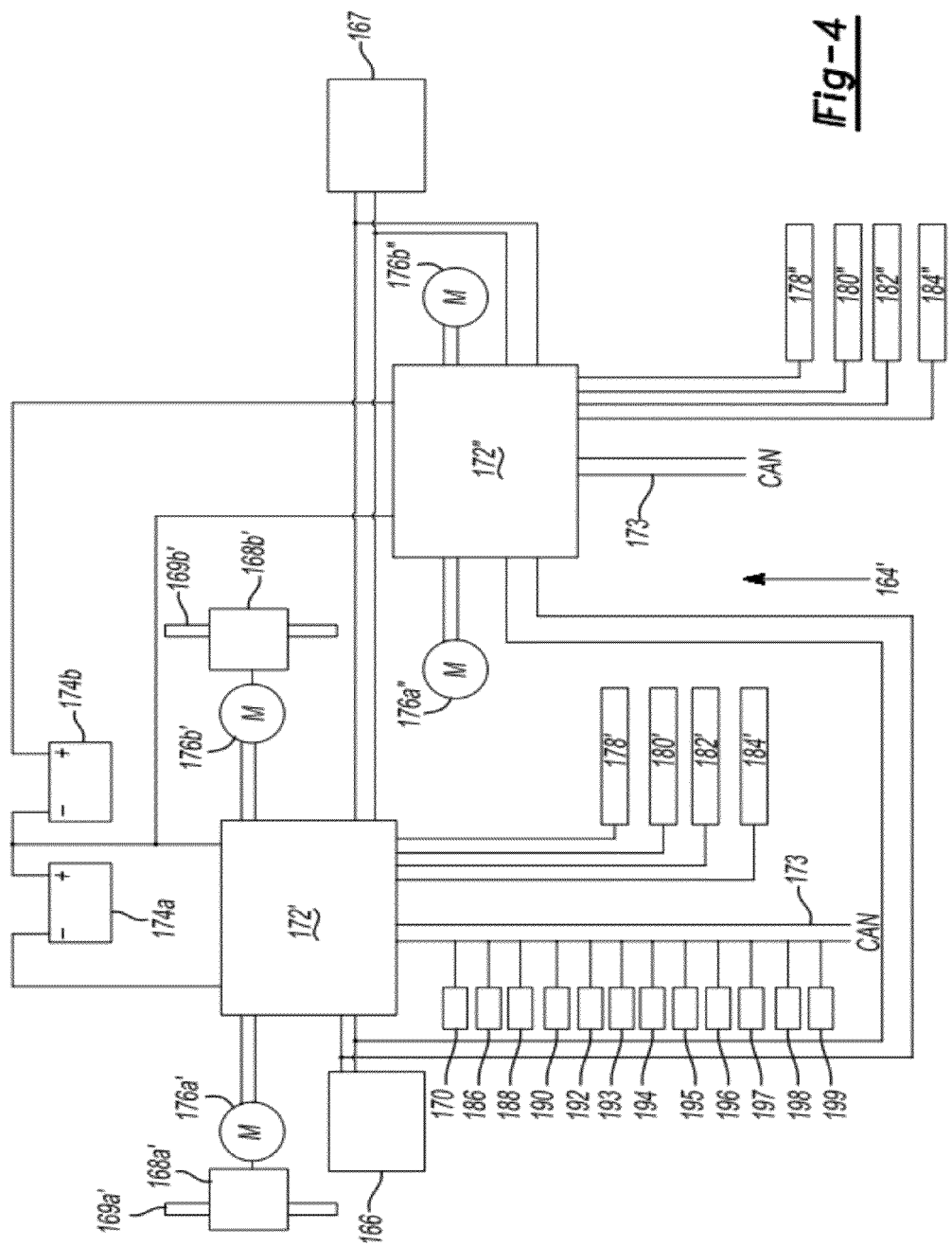
FIG. 4 is a schematic diagram of an alternative control system for the brake system of FIG. 2.

An alternative EPB-ECU 164' is shown in FIG. 4 in which a master ECU 172', having the same associated components (all labelled as in FIG. 3A, but with a ' suffix) is provided with a further slave ECU 172", again having identical associated components (in this case identically labelled as in FIG. 3, but with the suffix "). The master ECU 172', is connected to motors 176a' and 176b' on the front axle of the vehicle 101, whereas the slave ECU 172" is connected to parking brake motors 176a" and 176b" mounted on a rear axle of the vehicle 101 (or vice-versa in other embodiments). Certain components shown in FIG. 3 are not represented in FIG. 4 for reasons of clarity, but are nevertheless present.

The master ECU 172' is independently connected to the CAN bus from the slave ECU 172". The slave ECU 172" is connected to the second battery 174b. Both ECUs 172' and 172" are identically programmed. Under normal operation, only if both the master and the slave ECUs 172' and 172" detect a driver demand from the parking brake lever 170 or other inputs over the CAN bus, and after positive match of their outputs, the appropriate signals are sent to the parking brake motors 176a', 176b', 176a", 176b", the trailer control valve actuator 167, and the service brake valve actuator 166. The EPB-ECU 164 is configured such that only if one CAN bus connection fails or one battery fails will the functioning ECU alone signal a parking brake actuation on a single axle (albeit with a reduced ability to hold the vehicle). As a result, the EPB-ECU 164' of FIG. 4 can be said to be "failure mitigating."

FIGS. 4A to 4F illustrate further variations on the control system layout that provide various degrees of fault tolerance in the event of system malfunctions. Like parts are, where possible, denoted by like numerals as in FIGS. 3A to 4, but with the prefix '5' instead of '1'. The smart parking brake controller and/or gearbox controller and/or EBS controller may constitute the EPB-ECU discussed above and may receive inputs from some or all of the sensors discussed above in relation to FIGS. 3A to 4 and some or all of the outputs to indicate the status of the system as discussed above in FIGS. 3A to 4.

Figure 4A:
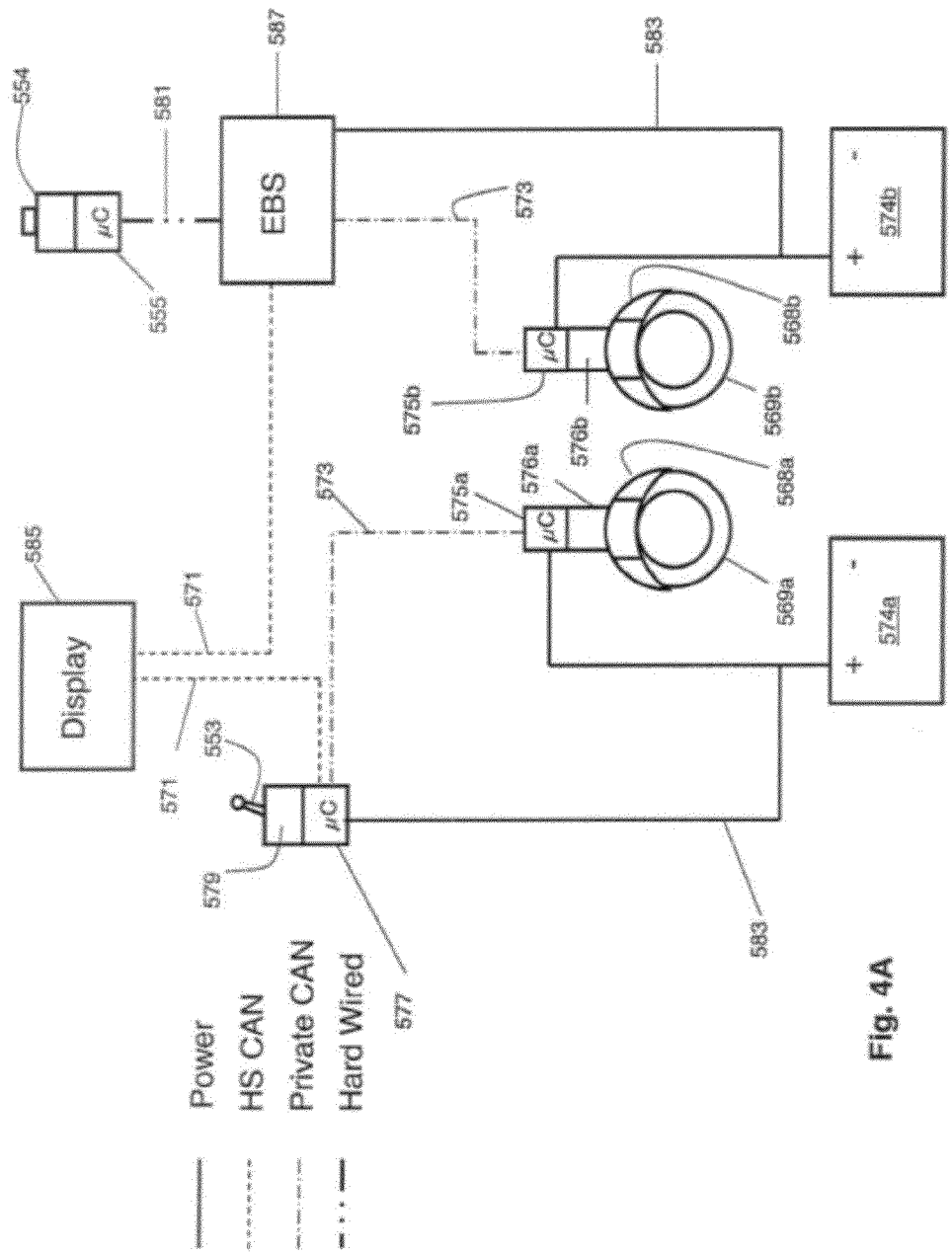
FIGS. 4A to 4F are schematic diagrams illustrating further control system layouts.

In FIG. 4A, the parking brakes 569a and 569b are provided with EPB actuators 576a and 576b incorporating "smart" EPB actuator controllers 575a and 575b. Each controller 575a and 575b is powered via power connections 583 from separate batteries 574a and 574b. A gearbox controller 577 of a gearbox 579 is also powered by one first battery 574a.

The gearbox is connected to a gear stick 553. The gear stick 553 is configured to be operable as a back-up parking brake demand input. This is achieved by a predetermined gear stick position (optionally in conjunction with an input from an ignition switch) being interpreted as parking brake demand. For example, there may be a specific "park" position. Alternatively, first gear plus ignition off and/or neutral plus ignition off may be interpreted as parking brake demand. An EBS controller 587 is powered by the second battery 574b.

A private CAN bus 573 enables the gearbox controller to communicate with the first EPB actuator controller 575a, and a further private CAN bus enables the EBS controller 587 to communicate with the second EPB actuator 575b. The EBS controller 587 is hardwired to a "smart" parking brake demand switch 554 incorporating a smart parking brake controller 555 by a connection 581.

High speed (HS) CAN buses 571 enable the gearbox controller 577 and the EBS controller 587 to signal a display 585 in the vehicle cab to show appropriate status indications.

In this embodiment, the smart parking brake controller 555 acts as the "master" ECU in normal operation. Alternatively, the EBS controller 587 may act as the master ECU. Either the EBS controller 587 or the gearbox controller 577 may act as a slave ECU in normal operation, but become master if the smart parking brake controller 555 or the park brake demand switch 554 fail.

The degree of fault tolerance provided by the system is illustrated by the table below.

| Fault | No. of Operable EPB Actuators |
|---|---|
| First battery or power supply faulty (open circuit) | 1 |
| Second battery or power supply faulty (open circuit) | 1 |
| First/Second battery or power supply faulty (short circuit) | 1 |
| HS-CAN failure (open circuit to one ECU) | 1 |
| HS-CAN failure (open circuit to all ECUs) | 1 |

-continued

| Fault | No. of Operable EPB Actuators |
|---|---|
| HS-CAN failure (short circuit) | 1 |
| Private-CAN failure (open circuit to one ECU) | 1 |
| Private-CAN failure (short circuit) | 1 |
| Master ECU failure (Smart EPB switch or EBS) | 1 |
| Slave ECU failure (EBS or Gearbox) | 1 |
| Actuator failure | 1 |

Thus, except in the instance of a complete power supply failure, at least one EPB actuator remains operable to provide a parking brake function.

It is also important to note that by having multiple parking brake demand inputs, the failure of, for example, the parking brake demand switch 554 itself, as well as the associated controller 555, does not prevent the driver indicating to a functioning ECU the need for parking brake operation. By using the gear stick 553 as the back-up demand input, this can be implemented without adding significantly to the cost.

Figure 4B:
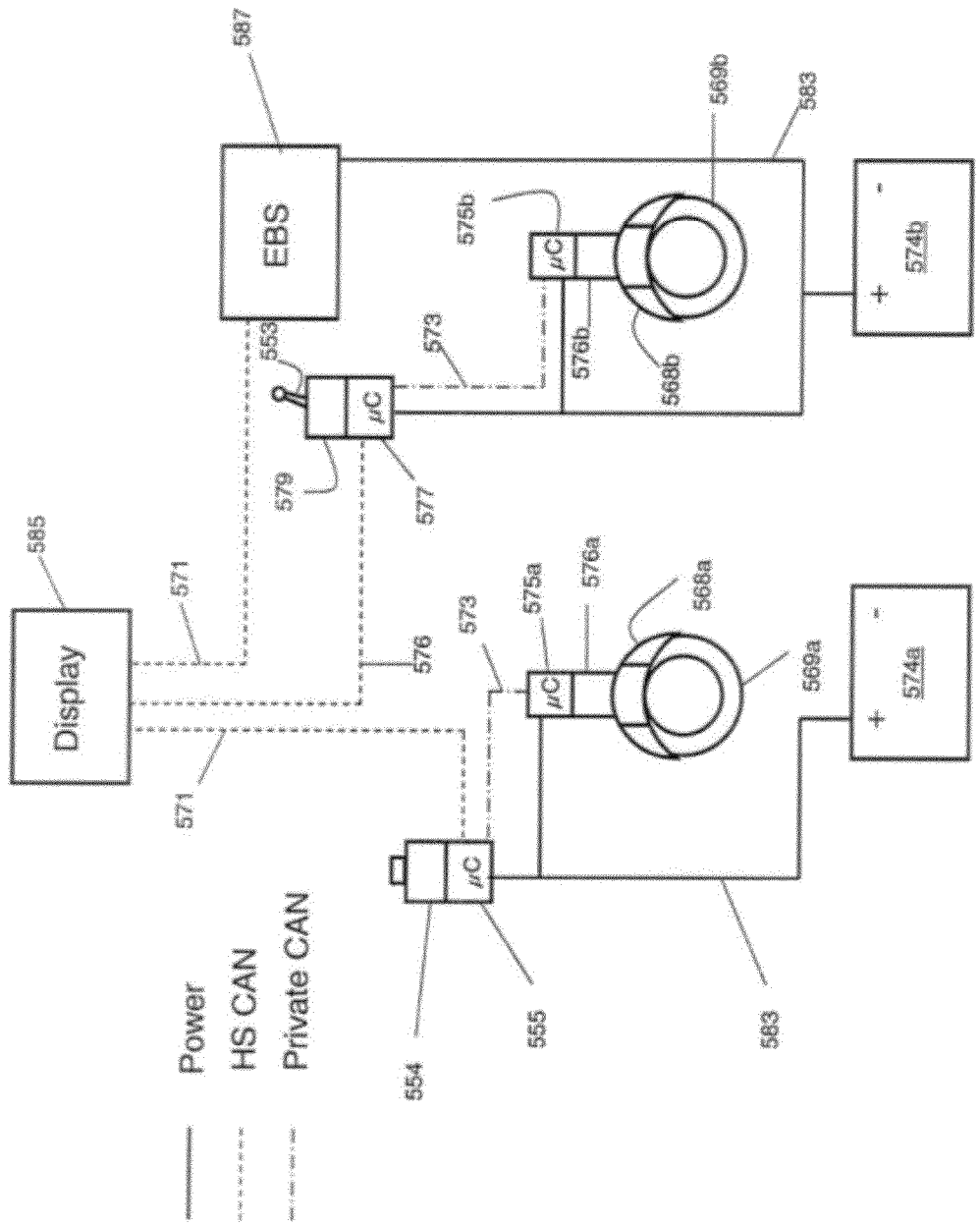

FIG. 4B illustrates a variant of the system illustrated in FIG. 4A. In this embodiment, the EPB switch is no longer hard wired to the EBS controller 587. By contrast, it is connected to the display 585 by a HS-CAN 571 and to the first smart EPB controller 575a by a private CAN. The EBS controller 587 is no longer connected to the second smart EPB controller 575b. The gearbox controller 577 is connected via a private CAN in its place.

In this embodiment, either the smart parking brake controller 555 or the EBS controller 587 may be the master ECU. Either the EBS controller 587 or the gearbox controller 577 may be the slave ECU.

The degree of fault tolerance provided by the system of FIG. 4B is similar to that of FIG. 4A, as illustrated by the table below.

| Fault | No. of Operable EPB Actuators |
|---|---|
| First battery or power supply faulty (open circuit) | 1 |
| Second battery or power supply faulty (open circuit) | 1 |
| First/Second battery or power supply faulty (short circuit) | 1 |
| HS-CAN failure (open circuit to one ECU) | 1 |
| HS-CAN failure (open circuit to all ECUs) | 1 |
| HS-CAN failure (short circuit) | 1 |
| Private-CAN failure (open circuit to one ECU) | 1 |
| Private-CAN failure (short circuit) | 1 |
| Master ECU failure (Smart EPB switch or EBS) | 1 |
| Slave ECU failure (EBS or Gearbox) | 1 |
| Actuator failure | 1 |

Figure 4C:
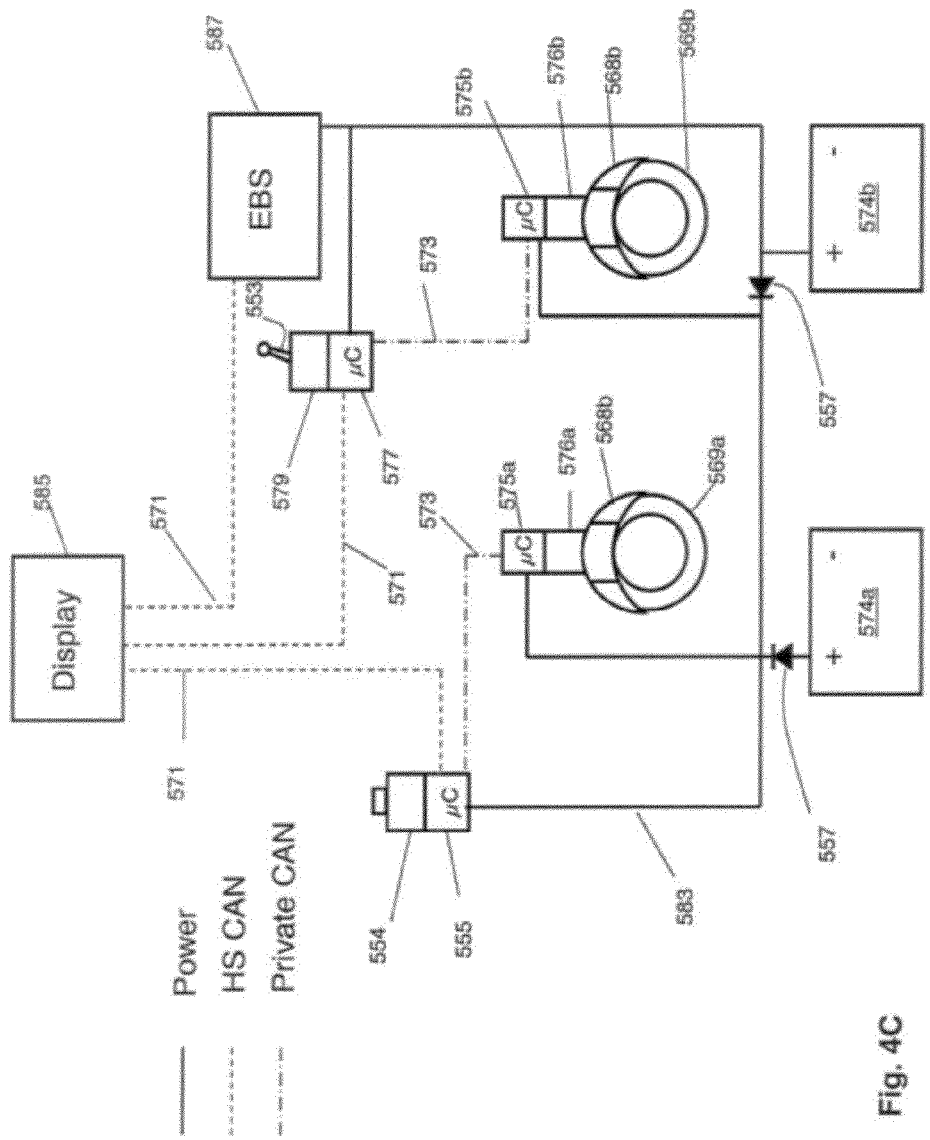

The embodiment of FIG. 4C is similar to FIG. 4B, except that the power supply lines 583 from the first and second batteries are connected rather than being independent. Diodes 557 are included in the lines 583 to provide some protection against short circuits or other failures of the batteries. However, the trade-off of this arrangement is less tolerance to faults in the supply cables. Thus, its desirability depends upon whether battery or supply cable failure is deemed to be a greater risk.

The degree of fault tolerance this provides is illustrated in the table below.

| Fault | No. of Operable EPB Actuators |
|---|---|
| First battery or power supply faulty (open circuit) | 1 |
| Second battery or power supply faulty (open circuit) | 1 |
| First/Second battery or power supply faulty (short circuit) | 1 |
| Power supply (short circuit in supply coupling) | 0 |
| HS-CAN failure (open circuit to one ECU) | 1 |
| HS-CAN failure (open circuit to all ECUs) | 1 |
| HS-CAN failure (short circuit) | 1 |
| Private-CAN failure (open circuit to one ECU) | 1 |
| Private-CAN failure (short circuit) | 1 |
| Master ECU failure (Smart EPB switch or EBS) | 1 |
| Slave ECU failure (EBS or Gearbox) | 1 |
| Actuator failure | 1 |

Figure 4D:
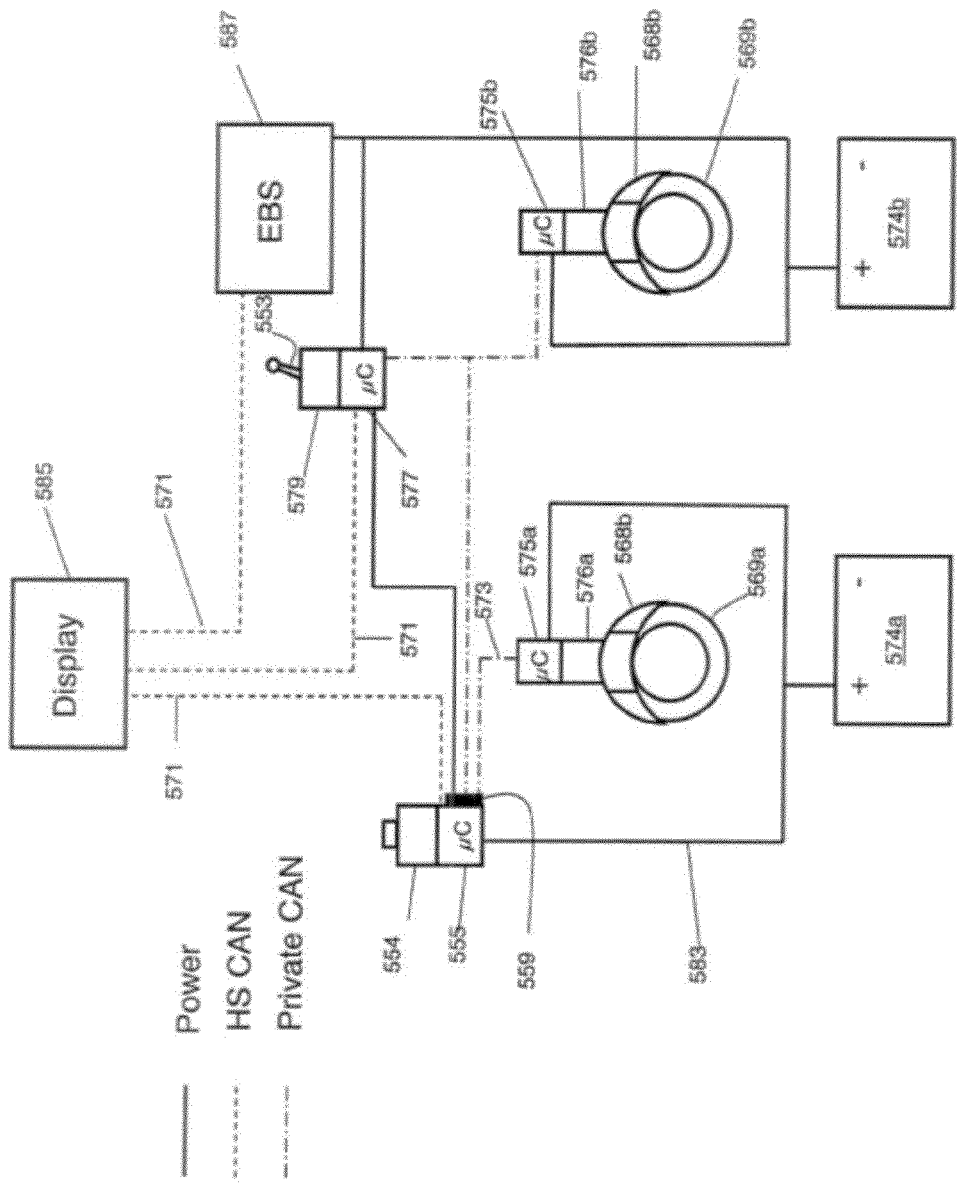

The embodiment of FIG. 4D utlilizes a bus coupler 559 in the form of a normally closed relay at the smart parking brake controller 555 to share power between the smart parking brake controller 555 and the gearbox controller 577. The coupler also joins the private CAN 573 between the two smart EPB controllers 575a and 575b and between the smart parking brake controller 555 and gearbox controller 577. Provided either the smart parking brake controller 555 or the gearbox controller has power, the relay 559 is held open (and they are able to operate their connected actuators using the HS-CAN 571 via the display 585). If the smart parking brake controller 555 fails, but the left power supply remains intact, the relay 559 closes and both actuators 576a and 576b are operational via the gearbox controller 577. If the gearbox controller 577 fails, the relay 559 closes and the other actuator control is taken over by the smart parking brake controller 555. The arrangement of FIG. 4D also protects against failure in the private CAN; one instance of damage only will cause one actuator 576a or 576b to be inoperable.

As a consequence, it is possible for both parking brake actuators to remain operable for a number of potential faults, as set out in the table below.

| Fault | No. of Operable EPB Actuators |
|---|---|
| First battery or power supply faulty (open circuit) | 1 |
| Second battery or power supply faulty (open circuit) | 1 |
| First/Second battery or power supply faulty (short circuit) | 1 |
| HS-CAN failure (open circuit to one ECU) | 2 |
| HS-CAN failure (open circuit to all ECUs) | 2 |
| HS-CAN failure (short circuit) | 2 |
| Private-CAN failure (open circuit to one ECU) | 1 |
| Private-CAN failure (short circuit) | 1 |
| Master ECU failure (Smart EPB switch or EBS) | 2 |
| Slave ECU failure (EBS or Gearbox) | 2 |
| Actuator failure | 1 |

Figure 4E:
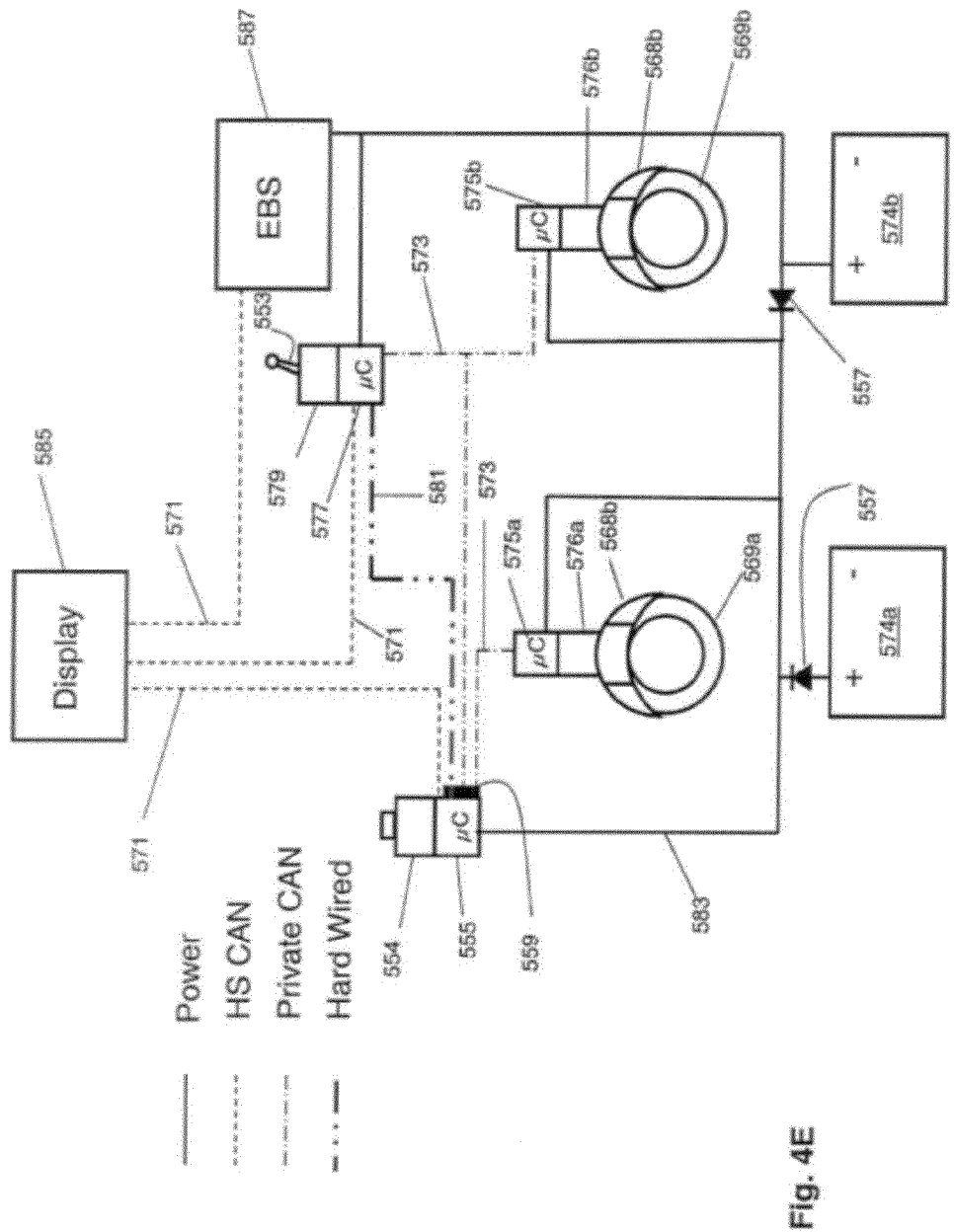

In FIG. 4E, the layout is a combination of the features of FIGS. 4C and 4E, except that the power supply connection is replaced by a hard-wired connection 581 between the smart parking brake controller 555 and the gearbox controller 577. This enables both EPB actuators to remain operable over a still wider range of potential faults as set out in the table below. Specifically, in FIG. 4E now both the smart parking brake controller 555 and the gearbox controller 577 can actively assume the control of the actuator 576a and 576b that it would not normally control, in the event of a range of failures. The power supply to both actuators 576a and 576b is widely ensured, with only a short circuit to ground in the power line causing a complete system failure.

| Fault | No. of Operable EPB Actuators |
|---|---|
| First battery or power supply faulty (open circuit) | 2 |
| Second battery or power supply faulty (open circuit) | 2 |
| First/Second battery or power supply faulty (short circuit) | 2 |
| Power supply (short circuit in supply coupling) | 0 |
| HS-CAN failure (open circuit to one ECU) | 2 |
| HS-CAN failure (open circuit to all ECUs) | 2 |
| HS-CAN failure (short circuit) | 2 |
| Private-CAN failure (open circuit to one ECU) | 1 |
| Private-CAN failure (short circuit) | 1 |
| Master ECU failure (Smart EPB switch or EBS) | 2 |
| Slave ECU failure (EBS or Gearbox) | 2 |
| Actuator failure | 1 |

Figure 4F:
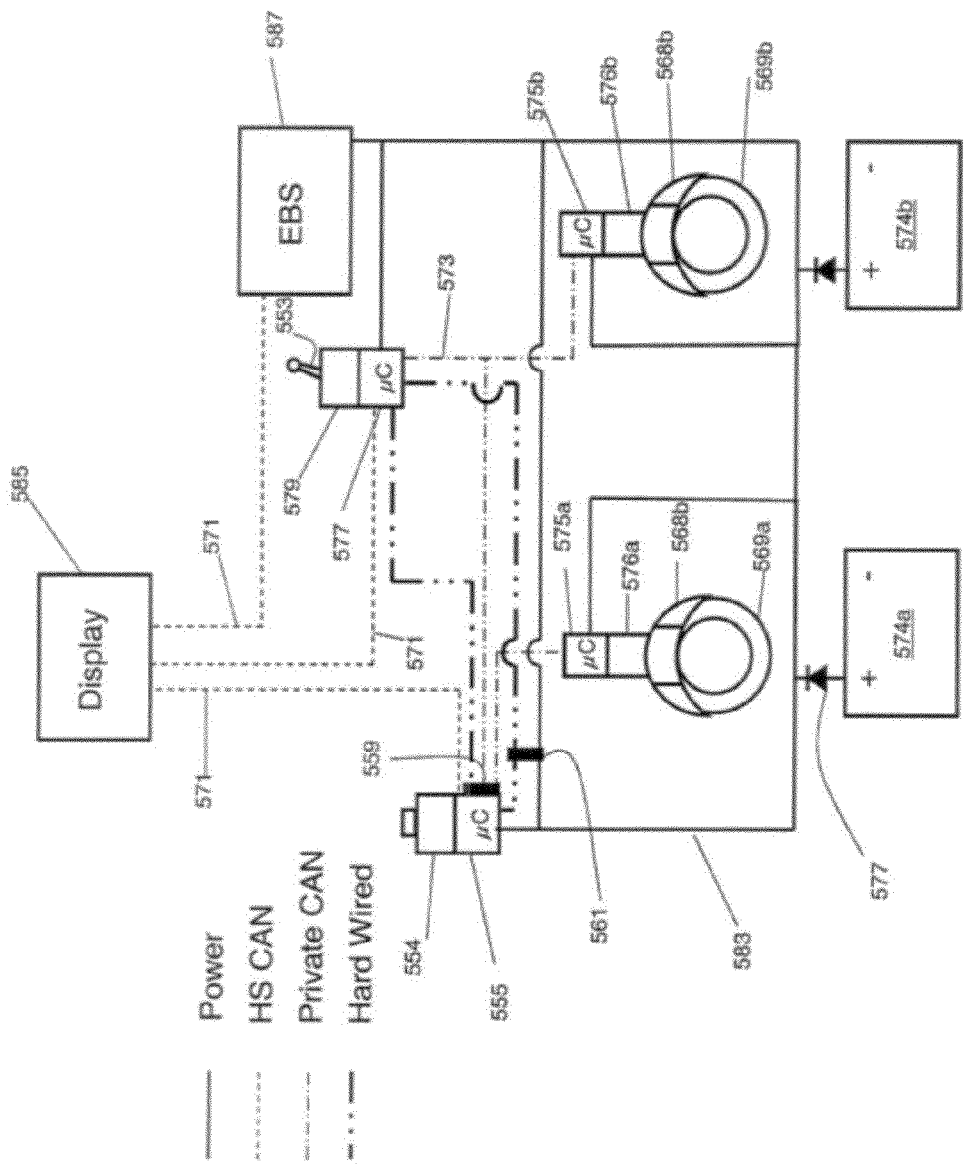

FIG. 4F provides a still greater degree of redundancy in the system by providing an active power supply coupler 561 that enables a single battery 574a or 574b to power all the critical system components in the event of a failure of the other battery, so at least one actuator 576a and 576b remains operable. The supply coupler 561 is held open when the system operates normally, but is configured such that it may be closed actively by either the smart parking brake controller 555 or the gearbox controller 577 if there is no power available to the portion of the system normally powered by one of the batteries, to re-establish power to that side. Thus, with this arrangement, some degree of parking function (with at least one actuator) is retained for all the potential faults listed in the table below.

| Fault | No. of Operable EPB Actuators |
|---|---|
| First battery or power supply faulty (open circuit) | 2 |
| Second battery or power supply faulty (open circuit) | 2 |
| First/Second battery or power supply faulty (short circuit) | 2 |
| Power supply (short circuit in supply coupling) | 1 |
| HS-CAN failure (open circuit to one ECU) | 2 |
| HS-CAN failure (open circuit to all ECUs) | 2 |
| HS-CAN failure (short circuit) | 2 |
| Private-CAN failure (open circuit to one ECU) | 1 |
| Private-CAN failure (short circuit) | 1 |
| Master ECU failure (Smart EPB switch or EBS) | 2 |
| Slave ECU failure (EBS or Gearbox) | 2 |
| Actuator failure | 1 |

The control systems of FIGS. 4A to 4F enable an EPB system that utilizes a gearbox controller 577 as a slave ECU, but become the master ECU in the event of failure of the usual master to comply with ECE Regulation 13. Without such a failure mitigating system, the use of the gearbox controller as fall back for the park brake in trucks would not comply with this regulation. This is because a second failure mitigating slave controller alone is not sufficient. The communication, the power supply, and the demand inputs need to be failure mitigating as well. The different system layouts described about enable a selection to be made about what potential failures can be tolerated by the system, balanced against the cost of such a system.

The electromechanical parking brakes 168a, 168b and 568a, 568b may be relatively slow acting, since it is necessary for output from the motor to be run through a reduction gear system to produce a sufficient braking force with a motor of sufficiently small size and low weight. Thus, in normal operating situations, it is usual for the EPB-ECU 164 or 164' to be programmed such that it actuates the service brake actuator via valve actuator 166 to enable a fast brake application upon receiving a driver demand signal from the parking brake lever 170. This is then followed by a signalling of the electromechanical parking brakes 168a and 168b for the longer term holding of the vehicle.

The system may also be provided with additional "hill-hold" functionality. A specific "hill-hold" button (not shown) may be provided for the driver, e.g., on the parking brake lever. For holding to function, the vehicle engine must be running, the driver must be in place (as detected by a seat-belt sensor for example), the vehicle must be at a standstill, and the ignition must be on. The function can be used to assist the driver to pull away on an incline without rolling backwards, or as a precursor to full parking brake application. In some alternative implementations, the holding may be applied automatically when the above conditions are met and released automatically when the driver pulls away ("drive away function") without the driver needing to press a button. The EPB-ECU 164 may also be configured such that hill-hold functionality times-out after being applied for a predetermined period of time. At this point, the full parking brake is applied.

The EPB-ECU 164 or 164' may also be configured to control the function of a differential lock (not shown) in certain embodiments. As well as a differential lock enabling a vehicle to have improved traction where one wheel on an axle has grip and another does not, it also enables the brake torque of a functioning parking brake actuator to be transferred to a wheel on the same axle whose corresponding parking brake actuator has failed.

Furthermore, on vehicles having four or more driven wheels, additional differential locks may be provided such that the brake torque from functioning actuators on all driven wheels can be transferred to the wheel with the non-functioning actuator. Thus, such an arrangement enhances the failsafe nature of the system.

It is advantageous for this to be implemented by the EPB-ECU 164 rather than, for example, by the vehicle's EBS system. EBS systems are typically rated to Automotive Safety Integrity Level (ASIL) C, whereas the EPB-ECU is ASIL D capable (as defined by ISO WD 26262, level D provides the highest level of risk reduction, whereas level C is one level lower). The safety critical nature of the differential lock means that it is desirable for it to have ASIL-D control. Furthermore, the EPB-ECU 164 already has the functionality to monitor vehicle speed to ensure the differential lock is only activated at low speeds (e.g., <7 kph).

Typical brake application scenarios are shown in more detail in FIGS. 5 and 6. In FIG. 5, the force application 210 corresponds to a driver of the vehicle pressing the "hill hold" switch 186 in the cab at time 211. Thus, the EPB-ECU 164 signals application of the service brake air cylinders 146a and 146b via the valve actuator 166, and a holding force $F_H$ is achieved. When the driver then wishes to pull away, he releases the park brake lever 170 or uses the drive away function, if present, and the service brake is released. The EPB-ECU 164 is programmed to only permit hill-holding while the ignition is on (the ignition switch sensor 193) and the driver is in his seat (the seatbelt switch 195). If either of these conditions ceases to exist, the EPB-ECU 164 signals application of the parking brakes 168a and 168b.

The force application 212 illustrates a holding phase instigated by the driver at time 214 by applying the parking brake lever 170 at time 214. At time 216, the holding phase times-out, and the electrical actuation is starting to build up clamp force just electromechanically. However, this process may alternatively be automatic, such that if the driver actuates the "hill hold" switch 186 and the vehicle comes to standstill, the signal to the EPB-ECU 164 first triggers the holding phase followed a period thereafter by the parking phase in accordance with the logic of the EPB-ECU 164. In other embodiments, the force to go from the holding force $F_H$ to a parking force $F_P$ may be applied by just the service brakes 146a or the service brake and electromechanical parking brakes 168a and 168b together. This reduces the amount of energy required from the electromechanical parking brake Once the required parking brake force has been achieved, the service brakes 146a and 146b are released, and the vehicle is held by the electromechanical parking brakes 168a and 168b alone. The electromechanical parking brakes 168a and 168b are configured such that they are self locking, and no energy is required to maintain the parking brake force.

At time 218, the driver releases the parking brake lever 170 or uses the drive away function, causing the EPB-ECU 164 to signal the back-driving of the electromechanical parking brakes 168a and 168b, thus releasing the parking brake and enabling the vehicle to be driven off.

Third force application 220 illustrates a scenario in which the air supply system on the vehicle has failed. In this instance, the electrical system remains operable and it is still possible to safely park the vehicle by applying just the electromechanical parking brakes 168a and 168b. At time 222, the driver applies the parking brake lever 170, and the EPB-ECU 164, having been signalled that the air system is non-functional via the CAN bus 173, follows an alternative process for this scenario whereby the electromechanical parking brakes 168a and 168b alone are applied. As can be seen by the gradient of the force line, full application of the parking brakes takes more time without the assistance of the service brakes 146a and 146b, but nevertheless the same parking force $F_P$ is ultimately achieved, and the vehicle may be safely parked.

FIG. 6 illustrates a further braking scenario in which the initial portion of the force application 224 corresponds largely to a force application 212. However, in this scenario, the vehicle is parked on a hill, and the driver has required assistance from the "hill hold" system. At time 225, the vehicle comes to standstill. Alternatively, the EPB-ECU 164 can be programmed in that way that after the vehicle comes to rest at time 225, the hill hold will automatically be applied. This applies the service brakes 146a and 146b. At time 226, the timeout or the driver leaving his seat causes the electromechanical actuators to engage for parking. At time 228, the driver then releases the parking brake lever 170, causing the service brakes 146a and 146b to be re-applied to the holding force position and subsequently the electromechanical parking brakes 168a and 168b to reduce to the holding force $F_H$. The driver can then pull away without risking the vehicle rolling backwards by, at time 230, just by engaging drive or releasing hill hold.

Figure 7:
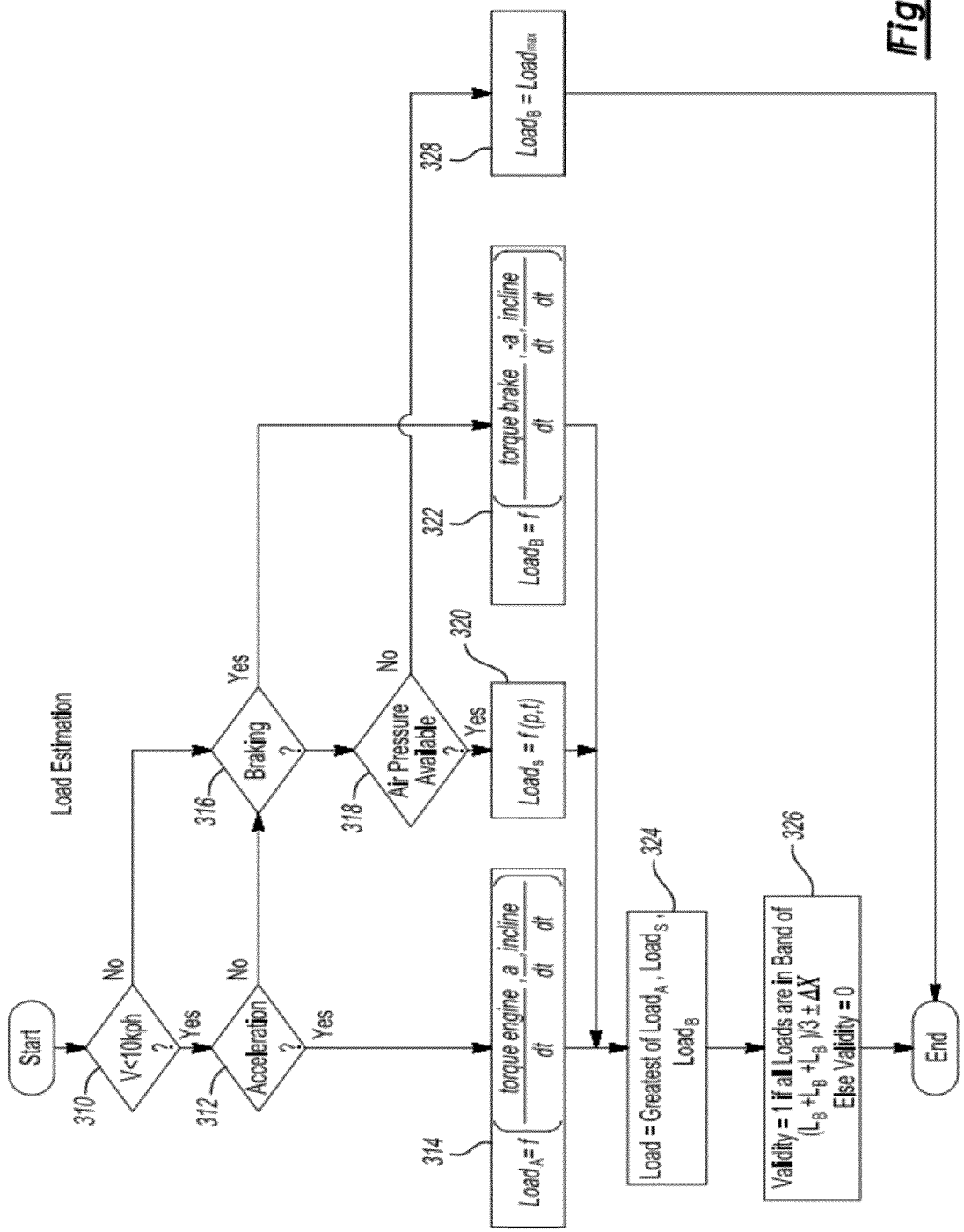
FIG. 7 is a flow chart illustrating the function of a load estimation module of a system according to the present invention.

FIG. 7 illustrates an algorithm followed by the EPB-ECU 164, by which the holding force $F_H$ and the parking force $F_P$ may be adjusted by estimating the load or weight of the vehicle 101.

There are a number of ways by which the weight of the vehicle may be estimated, without including a large number of additional sensors on the vehicle. At step 310, the EPB-ECU 164 determines whether the vehicle is travelling at less than 10 kilometers per hour (by using signals from wheel speed sensors 199). If yes, then at step 312, it determines whether the vehicle is accelerating (again by using the wheel speed sensors) and if yes, determines the load of the vehicle at step 314 by comparing values for engine torque (determined from torque sensor 196), achieved acceleration and incline (by using the inclinometer 190) to derive the value $load_A$. The lower the acceleration for a given torque, the greater the vehicle weight If at step 310 the vehicle is travelling at greater than 10 kilometers per hour, or at step 312 it is not accelerating, the EPB-ECU 164 determines at step 316 if the vehicle is braking from the brake pedal switch 188. If no, the EPB-ECU 164 determines at step 318 whether air pressure is available, and if yes, derives load by using data from a the load sensitive brake force meter sensor 192 or from a sensor measuring air pressure in the air suspension system (not shown).

If at step 316 the EPB-ECU 164 determines that no braking is occurring and at step 318 no air pressure is available, the load is set to $load_{MAX}$ at step 328 (i.e., the maximum gross vehicle weight). If braking is occurring at step 316 a further value for the weight, $load_B$ is determined from the sum values obtained for the brake torque from sensor 197, retarder torque from sensor 198, and engine braking from engine torque sensor 196 in conjunction with deceleration from wheel speed sensors 199 and inclinometer 190 at step 322.

Thereafter, at step 324, the EPB-ECU 164 determines which of loads $load_A$, $load_S$ and $load_B$ is the largest. In its subsequent calculations, it uses the largest value for safety reasons. This operation may be carried out periodically and will collect values that have been determined from steps 314, 320, and 322 within a certain predetermined period of time in order to enhance the accuracy of the load estimation. Of course, since certain vehicles (e.g., road salting trucks or refuse trucks) will vary in weight while they are driving along, the period of validity of any particular calculated reading cannot be too long. The frequency with which step 324 is carried out and the period of validity depends upon vehicle application, with aforesaid road salting trucks and refuse trucks requiring higher frequency and lower validity periods than standard haulage/line-haul trucks.

If multiple values for the weight are available from steps 314, 320 and 322, then at step 326 the validity of these weight calculations may be determined by averaging the calculated loads and checking whether any of these depart from this average value by more than a predetermined error amount $\Delta X$. If the load readings are not considered to be valid because the divergence is too great, then the load estimation may instead default to the maximum gross vehicle weight for the greatest amount of safety.

Once the load has been estimated, this value can then be used in conjunction with signals from the inclinometer 190 to provide one set of values that can be used by the EPB-ECU 164 to determine the force required to hold or park the vehicle safely because heavier vehicles and steeper inclines require a greater holding force from the parking brake. In addition, the weight or load is an important value for use in subsequent calculations to estimate brake component temperatures.

When estimating the temperature of a brake component, particularly the brake discs 169a and 169b, it is desirable to determine the volume of disc because the smaller the volume of the disc, the more it will heat for a given amount of energy imparted to it by the braking operation. This is particularly applicable for heavy vehicle brakes since over the life of a brake disc, it may lose 6 kilograms or thereabouts in mass as it wears. Therefore, at the end of the life of the disc it will reach a higher temperature for a given braking operation than when unworn. In light vehicles, the loss of mass as a proportion of starting weight is usually less significant and ignored by using the mass of worn discs.

Figure 8:
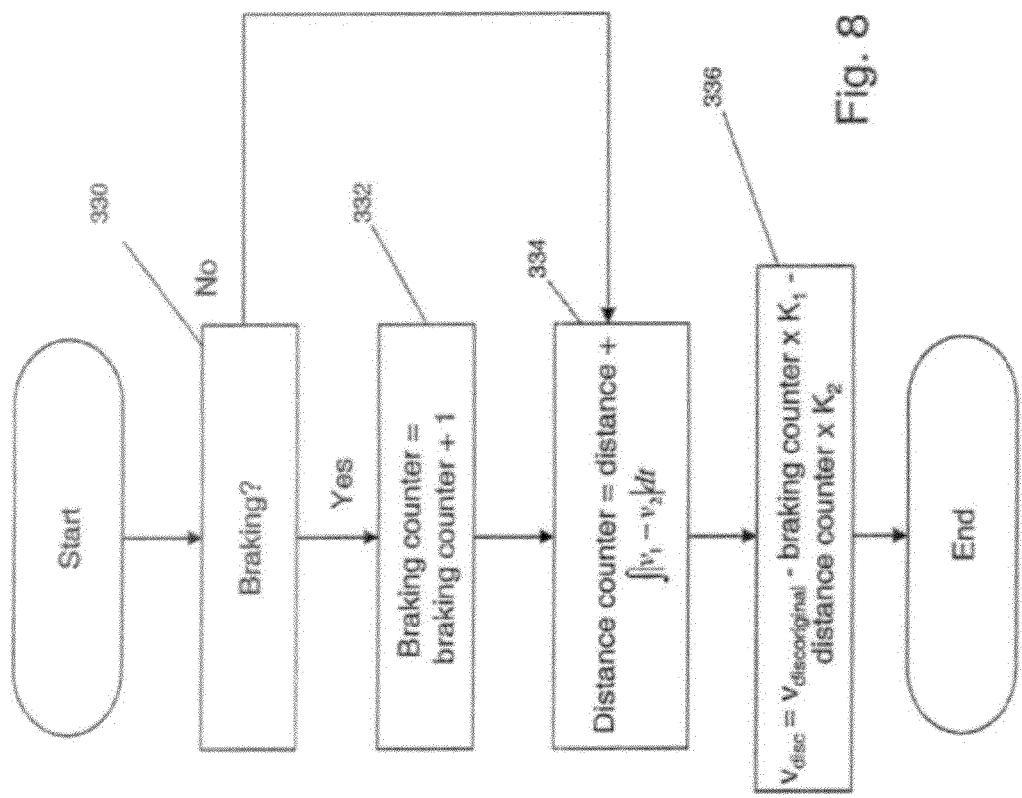
FIG. 8 is a flow chart for obtaining a calculated disc volume of a brake disc.
Figure 11:
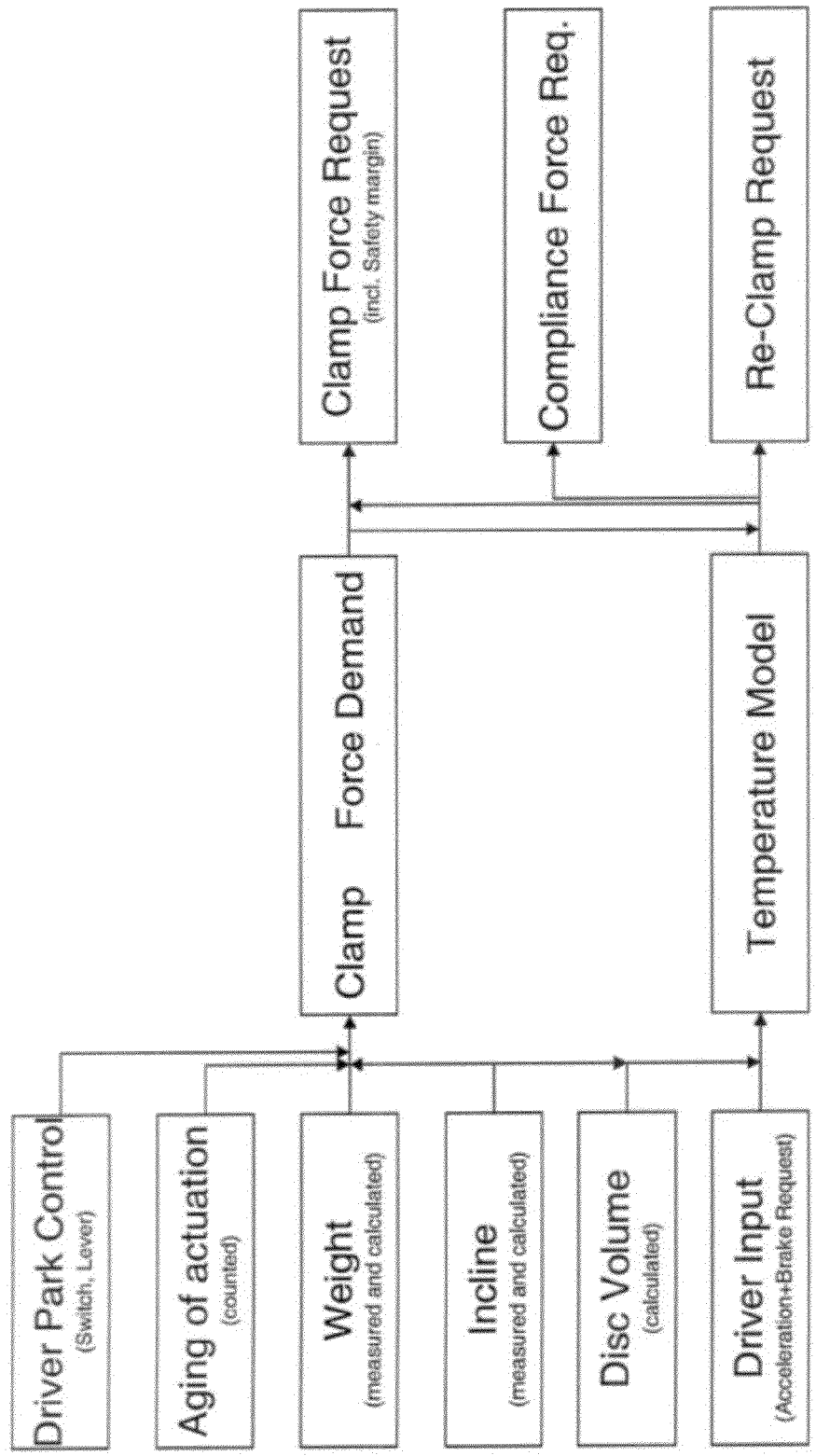
FIG. 11 is a schematic diagram of the control system function.

FIG. 8 illustrates an algorithm for determining the volume of a brake disc over its life. Thus, at step 330, the EPB-ECU 164 determines if the vehicle brakes are being applied to slow the vehicle. If yes, then a braking counter increments its value 1 higher at step 332. Then, at step 334, a distance counter adds to the total distance travelled from the velocity of the vehicle and the time since the algorithm last ran. A limited amount of wear occurs to the brake disc even if no braking is occurring, so it is important to monitor the total distance travelled for a particular disc. If no braking is occurring at this time, step 332 is skipped.

At step 336, the volume of the disc is determined by subtracting from the original volume $V_{discoriginal}$ a value corresponding to the braking counter times a factor $K_1$ corresponding to the average amount of wear during a braking operation, and by further subtracting a value corresponding to the distance counter multiplied by a second factor $K_2$ for the average wear of the disc during normal driving and which no braking is occurring to provide a value for $V_{disc}$. Typically, the algorithm runs every hundred milliseconds in order to provide a continuous value for the disc volume. The counters may be reset by a diagnostic program each time a disc is replaced. The algorithm runs for at least each disc that has a parking brake attached and may run for all discs in order to monitor wear, as well as for use in heat calculations.

An alternative embodiment for disc volume calculation employs continuous brake pad wear sensors to derive a value for disc volume, as there is a relationship between pad wear and disc wear for given disc and pad materials. However, since the service life of pads and discs varies, changes of both pads should be logged by a diagnostic program for meaningful volume data to be derived over the life of the brake.

Having determined the estimated weight of the vehicle and the volume of each brake disc, it is then possible to use these values in conjunction with values for the speed at the beginning and end of a braking operation, the density of the brake disc, the heat capacity of the brake disc, the distribution of the brake force between the wheels of a vehicle, and an empirically derived function relating to the proportion of energy entering the brake disc during operation in order to estimate the increase in temperature of each brake disc of the vehicle during this operation.

This is achieved in accordance with the following equation:

$$\Delta T_+ = \frac{B_{HA} \times f_x \times \frac{1}{2} \times \frac{1}{2} m_{Fz}(v_{start}^2 - v_{end}^2)}{\rho \times c_{disc} \times V_{disc}}$$

Where:
$\Delta T_+$=the increase in temperature [° C.]
$B_{HA}$=the front to rear distribution of the brake force.
$f_x$=the portion of energy from the braking operation going into the disc (typically ≈80%).
$m_{Fz}$=the estimated weight of the vehicle as determined by the load estimation module [kg].
$\rho$=the density of the brake disc [kg/mm$^3$].
$c_{disc}$=the heat capacity of the brake disc [J/(kg×K)]
$V_{disc}$=the calculated volume of the brake disc obtained from the disc volume algorithm [mm$^3$].
$v_{start}$=the vehicle speed at the beginning of the braking operation [m/s]
$v_{end}$=the vehicle speed at the end of braking [m/s]

Where $v_{end}$ is calculated according to the equation:

$$v_{end}=v_{start}-a_{Fz} \times t$$

Where:
$a_{Fz}$=the vehicle deceleration [m/s$^2$] (also factoring in input from the inclinometer for situations in which the vehicle is driving down hill, but with a constant speed against the influence of gravity).
t=time [s].

And where each axle comprises two brakes sharing the braking effort equally.

$V_{start}$ and optionally $v_{end}$ may be derived from the vehicle ABS sensor and/or the engine speed and the gear selection sensor. In a preferred embodiment, both are used with the higher of the two used for $v_{start}$ and the lower for $v_{end}$ in order to provide optimum safety. If $v_{end}$ is obtained in this way, it need not be calculated using the equation above.

Thus, starting from the ambient temperature from temperature sensor 194 (the default value may be set at 50° C., for example), the EPB-ECU 164 can sum the temperature change of each brake application to determine the temperature of the brake surface.

Of course, the brake disc will cool over time from an elevated temperature towards the ambient air temperature. The faster the vehicle is travelling, the greater the amount of cooling that will occur. Thus, in addition to the calculation of increases in temperature due to braking following the temperature model set out above, it is also necessary to have a temperature model for the cooling of the brake.

This may be determined using the following equation:

$$\Delta T_- = (T_{disc} - T_{env}) \times \left(1 - e^{\frac{-\Delta t}{k_v}}\right)$$

Where:
$\Delta T_-$=the decrease in temperature [° C.]
$T_{disc}$=the temperature of the brake disc [° C.]
$T_{env}$=ambient temperature [° C.]
e=the exponential constant
t=time [s]
$k_v$=a speed dependent cooling constant that is determined using the following equation:

$$k_v = \frac{\rho \times c_{disc} \times V_{disc}}{A_{disc} \times k_{cool}(v)}$$

$\rho$=the density of the brake disc [kg/mm$^3$].
$c_{disc}$=the heat capacity of the brake disc [J/(kg×K)]
$V_{disc}$=the calculated volume of the brake disc obtained from the disc volume algorithm [mm$^3$].
$A_{disc}$=the cooling surface of the brake disc [m$^2$]
$k_{cool}(v)$=a speed dependent cooling curve that is specific to the characteristics of a particular vehicle.

However, where $\Delta t$=20 milliseconds, it is possible to use the approximation:

$$1-e^x=x(|x<<1|)$$

such that the cooling may be calculated using the following simplified equation $$\Delta T_- = (T_{disc} - T_{env}) \times \left(\frac{-\Delta t}{k_v}\right)$$

Therefore, starting from a condition in which the brake disc of a vehicle is at ambient air temperature, the temperature of the brake disc can be estimated at any time during the subsequent driving of the vehicle by employing the temperature model for the heating of the brakes when the brakes are applied and the temperature model for the cooling of the brake during free running of the vehicle.

As a result, when the vehicle driver wishes to park the vehicle, the EPB-ECU 164 has a value for the temperature of each brake disc on the vehicle that has a parking brake fitted.

From this temperature, it is possible to determine how much the brake disc will shrink as it cools towards the ambient air temperature as the coefficient of thermal expansion of the brake disc material is known.

Ignition off time will be considered as well and used for a cooling function without vehicle speed after the next ignition on as long as the values of the temperature model are above ambient temperature, and if this is not available, as long the values of the temperature model are above the default value.

Turning now to FIGS. 9 and 10, the graphs of force versus time shown therein illustrate how knowledge of brake disc temperature and other factors such as the weight of the vehicle and incline may be used to alter the "hill hold" holding force $F_H$ and the parking force $F_p$.

In FIG. 9, the thicker lines on the force versus time graph correspond to the lines on the force application 212 of FIG. 5 and has been labelled generally 412 and includes a holding portion at which a holding force $F_H$ is applied by the service brake actuator 146a and 146b and a parking force $F_P$ at which a parking brake force is applied by the electromechanical parking brake actuator 168a and 168b.

However, if the EPB-ECU 164 determines that the incline on which the vehicle is to be held during the holding phase is low and/or the load of the vehicle is low, then it signals the service brake actuators 146a, 146b, 148a, 148b to apply a lower holding force $F_{Hlow}$.

If a high gradient and high load is determined, then a higher holding load $F_{Hhigh}$ is signalled to the service brake actuators.

If a high gradient combined with a low load or a low gradient combined with a high load is detected, then the intermediate holding force $F_H$ is still applied. As "holding" does not occur for significant periods of time, it is unnecessary to consider the heat of the disc as a factor for the holding force.

When the driver applies a park command, then a high gradient and high load or high temperature results in a higher parking force $F_{Phigh}$ (e.g., 160 kN) being applied by the electromechanical parking brake 168a and 168b.

However, if a low gradient and low load and low temperature is detected, then a lower force $F_{Plow}$ (e.g., 80 kN) is applied by the electromechanical parking brake 168a and 168b. The intermediate force $F_P$ (e.g., 120 kN) is similarly applied only if there is a high gradient and low load or low gradient and high load.

FIG. 10 differs from FIG. 9 in that rather than only three possible load values being available for holding and parking, the loading may be adjusted linearly between the upper and lower limits anywhere within the shaded area of the graph, thereby allowing finer control of the brake forces applied by the service and parking brake.

In circumstances where the parking brake is applied with a brake disc at a high temperature, a number of different approaches may be employed to ensure that a secure parking of the vehicle may be achieved.

One possibility is (disclosed in FIGS. 9 and 10) applying a sufficiently high force during parking initially such that even when the disc cools and contracts, there is still a sufficient force to hold the vehicle. Alternatively, the EPB-ECU 164 may be programmed such that after a predetermined period of time, for example 30 minutes, it will signal the driving of the electromechanical parking brakes 168a and 168b in order to again provide a sufficiently high braking force to hold the vehicle.

In another alternative, the electromechanical parking brakes 168a and 168b may be configured with a resilient element to take up the contraction with a minimal reduction in clamp force.

Finally, and least desirably, the EPB-ECU 164 may simply provide a warning to the driver that the disc temperature is too high to guarantee a sufficient clamp force after cooling and that he or she must make alternative provision to ensure the vehicle is held (e.g., ensuring that a transmission lock is in place or that chocks are placed under the wheels).

The EPB-ECU 164 may also be programmed with a number of further algorithms. For example, to account for the ageing of the caliper mechanism and the electromechanical parking brakes 168a and 168b which would result in a greater internal frictional resistance to application of the parking brake, a counter may be provided within the EPB-ECU 164 to count the number of ignition cycles, brake applications, park brake applications and ignition on time, and compensate for such wear.

The various factors influencing initial clamp force, compliance force (where a resilient element is present within the parking brake to account for contraction) or the amount of reclamp force to be applied after cooling are illustrated schematically in FIG. 12.

Furthermore, as a final safeguard against vehicle roll-away, the EPB-ECU 164 may monitor the wheel speed sensors mounted on the wheels for the ABS/EBS/ESP system of the vehicle to detect unexpected pulses therein. However, to enable the EPB-ECU 164 to react sufficiently quickly to a roll-away situation, the system should be configured to detect a single pulse from the ABS/EBS control unit since the vehicle may otherwise have too great momentum to stop the roll-away by reapplication of the service brake.

ABS/EBS either are kept in operation after parking (independently from ignition status) or are reactivated in the critical time for roll away. They are configured to wake up the EPB ECU 164 for re-clamping.

The EPB-ECU 164 is preferably programmed with a test system that, when used on vehicles including a tractor and trailer, enables the trailer brakes to be released while the tractor parking brakes are applied. This enables the driver to check whether the tractor unit parking brakes are capable of holding the combination without the trailer brakes functioning. This may be achieved by having a three position handbrake lever 170, which in addition to "off" and "applied" positions, also has a "test" position for this purpose. The handle is pulled three times in the test position to enter this test mode and exited by a single pull or a timeout of e.g., 10 seconds.

Alternatively, the lever may have a stable neutral position and unstable "off" and "applied" positions, with a plurality of user inputs into the applied position causing the test mode to be entered, and a user input into the "off" position (or a timeout) causing the test mode to be exited.

Numerous changes may be made within the scope of the present invention. For example, the service brake valve actuator 166 may (together with a separate valve) be separate from the service brake valve 140. In certain embodiments of the present invention, the surface temperature of the brake discs may be measured directly by using a sliding temperature sensor, e.g., a sliding negative temperature coefficient thermistor.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An electromechanical parking brake system for a heavy vehicle braked by air-actuated service brakes, the electromechanical parking brake system comprising:
   an EPB-ECU including a master ECU and a slave ECU;
   a first electromechanical parking brake actuator controlled by the EPB-ECU;
   a redundant sub-system for applying a second parking brake in the event of a failure in the EPB-ECU or the electromechanical parking brake actuator; and
   wherein, when no fault is detected, the master ECU and the slave ECU are both configured to detect a parking demand input and provide an output signal, and to only signal actuation of the electromechanical parking brakes only if the output signals match.

2. The electromechanical parking brake system according to claim 1, wherein the redundant sub-system includes at least two conventional spring brakes.

3. The electromechanical parking brake system according to claim 1, wherein the master ECU and the slave ECU are configured to control operation of the first electromechanical parking brake actuator and a second electromechanical parking brake actuator, respectively.

4. The electromechanical parking brake system according to claim 1, wherein the master ECU and the slave ECU are connected to separate first and second power sources, respectively.

5. The electromechanical parking brake system according to claim 4, wherein a power supply connection is provided such that at least one of the second power source supplies the master ECU and the first power source supplies the slave ECU.

6. The electromechanical parking brake system according to claim 1, wherein the master ECU is one of a smart parking brake demand switch, an EBS controller or a gearbox controller.

7. The electromechanical parking brake system according to claim 1, wherein, when a fault is detected in either the master ECU or the slave ECU, the functional one of the master ECU and the slave ECU is configured to signal actuation of the electromechanical parking brakes connected thereto, independent of the non-functional ECU.

8. The electromechanical parking brake system according to claim 1, wherein the redundant sub-system is at least one local controller positioned proximate a corresponding parking brake actuator, remote from the EPB-ECU, and capable of controlling a supply of power to the parking brake actuator, the local controller being configured to receive signals from a further separate vehicle controller.

9. The electromechanical parking brake system according to claim 8, wherein the further separate vehicle controller is one of a gearbox controller and an EBS controller.

10. The electromechanical parking brake system according to claim 1, wherein the EPB-ECU is configured to control operation of a differential lock.

11. The electromechanical parking brake system according to claim 1, including an independent first parking brake driver demand input and a second parking brake driver demand input.

12. The electromechanical parking brake system according to claim 11, wherein one of the inputs is a parking brake switch.

13. The electromechanical parking brake system according to claim 11, wherein one of the inputs is a gear stick input.

14. An electromechanical parking brake system for a heavy vehicle comprising:
   a tractor unit;
   a trailer unit;
   a user input device; and
   a controller, wherein the controller is configured upon receiving a signal corresponding to a predetermined user input from the user input device to enter a test mode in which the controller signals release of a brake on the trailer unit and maintains or applies a parking brake on the tractor unit such that a vehicle user can determine whether the parking brake of the tractor unit alone is capable of holding the tractor unit and the trailer unit.

15. The system according to claim 14, wherein the predetermined user input includes a plurality of individual inputs.

16. The system according to claim 14, wherein the user input device is configured to selectively signal application of the parking brakes under normal operation.

17. The system according to claim 16, wherein the user input device assumes a stable parking brake off position, a stable parking brake, on position and a test position, and is configured such that the predetermined user inputs will result in signalling the release of the trailer brakes only in the test position.

18. The system according to claim 16, wherein the user input device assumes a stable neutral position, an unstable parking brake release position and an unstable parking brake apply position, wherein the plurality of individual inputs includes a plurality of pulls from the stable neutral position to the unstable parking brake apply position.

19. The system according to claim 14, wherein the system is configured such that a further input returns the electromechanical parking brake system to normal operation.

20. The system according to claim 14, wherein expiry of a predetermined timeout delay returns the parking brake system to normal operation.

21. The system according to claim 14, wherein the user input device is a lever.

22. The system according to claim 15, wherein the predetermined user input includes three inputs.

23. The system according to claim 15, wherein the plurality of individual inputs includes pulls on the user input device.

* * * * *